United States Patent
Takeno

(10) Patent No.: US 11,753,563 B2
(45) Date of Patent: Sep. 12, 2023

(54) POLYASPARTIC COATING COMPOSITION, COATING FILM, AND COATED ARTICLE

(71) Applicant: ASAHI KASEI KABUSHIKI KAISHA, Tokyo (JP)

(72) Inventor: Satoshi Takeno, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 16/491,027

(22) PCT Filed: Mar. 1, 2018

(86) PCT No.: PCT/JP2018/007802
§ 371 (c)(1),
(2) Date: Sep. 4, 2019

(87) PCT Pub. No.: WO2018/163959
PCT Pub. Date: Sep. 13, 2018

(65) Prior Publication Data
US 2020/0010723 A1  Jan. 9, 2020

(30) Foreign Application Priority Data

Mar. 7, 2017 (JP) .................................. 2017-043141
Sep. 4, 2017 (JP) .................................. 2017-169741

(51) Int. Cl.
| | | |
|---|---|---|
| C09D 177/04 | (2006.01) | |
| C08G 18/42 | (2006.01) | |
| C08G 18/79 | (2006.01) | |
| C09D 5/08 | (2006.01) | |
| C09D 175/04 | (2006.01) | |
| C08G 18/73 | (2006.01) | |
| C08G 18/02 | (2006.01) | |
| C08G 18/09 | (2006.01) | |
| C08G 18/78 | (2006.01) | |
| C09D 175/06 | (2006.01) | |
| C08G 18/10 | (2006.01) | |
| B05D 7/00 | (2006.01) | |
| B05D 7/24 | (2006.01) | |
| B32B 27/18 | (2006.01) | |
| B32B 27/40 | (2006.01) | |
| C08G 18/32 | (2006.01) | |

(52) U.S. Cl.
CPC ............ *C09D 177/04* (2013.01); *B05D 7/00* (2013.01); *B05D 7/24* (2013.01); *B32B 27/18* (2013.01); *B32B 27/40* (2013.01); *C08G 18/022* (2013.01); *C08G 18/092* (2013.01); *C08G 18/10* (2013.01); *C08G 18/32* (2013.01); *C08G 18/4277* (2013.01); *C08G 18/73* (2013.01); *C08G 18/7837* (2013.01); *C08G 18/79* (2013.01); *C08G 18/792* (2013.01); *C09D 5/08* (2013.01); *C09D 175/04* (2013.01); *C09D 175/06* (2013.01)

(58) Field of Classification Search
CPC ............ B05D 7/00; B05D 7/24; B32B 27/18; B32B 27/40; C08G 18/4277; C08G 18/79; C08G 18/73; C08G 18/792; C08G 18/022; C08G 18/092; C08G 18/7837; C08G 18/10; C08G 18/32; C09D 177/04; C09D 5/08; C09D 175/04; C09D 175/06
See application file for complete search history.

(56) References Cited

U.S. PATENT DOCUMENTS

| | | |
|---|---|---|
| 5,126,170 A | 6/1992 | Zwiener et al. |
| 5,412,056 A | 5/1995 | Zwiener et al. |

(Continued)

FOREIGN PATENT DOCUMENTS

| | | |
|---|---|---|
| CN | 105008424 A | 10/2015 |
| EP | 0743332 | 11/1996 |

(Continued)

OTHER PUBLICATIONS

European Search Report, European Patent Office, Application No. 18763807.7, dated Feb. 10, 2020.

(Continued)

*Primary Examiner* — Patrick D Niland
(74) *Attorney, Agent, or Firm* — GREENBLUM & BERNSTEIN, P.L.C.

(57) ABSTRACT

The present invention provides a polyaspartic coating composition containing (A) an aspartic acid ester compound represented by the following formula (I)

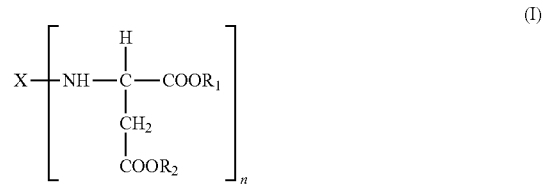

[in formula (I), X is an n-valent organic group, and $R_1$ and $R_2$ are organic groups which are inert to the isocyanate group under a reaction condition, and n is an integer of 2 or more.], and (B) a polyisocyanate obtained by using one or more diisocyanate monomers selected from the group consisting of an aliphatic and alicyclic diisocyanate and a polycaprolactone polyol having a number-average molecular weight of 500 to 1,500, wherein a ratio of the polycaprolactone polyol is 20% by mass or more, and the polyisocyanate component contains 10.0% by mass or less of an isocyanurate trimer.

17 Claims, No Drawings

(56) References Cited

U.S. PATENT DOCUMENTS

| | | | |
|---|---|---|---|
| 6,183,870 B1 | 2/2001 | Hergenrother et al. | |
| 6,989,421 B2* | 1/2006 | Grady | C09D 133/14 |
| | | | 525/123 |
| 2005/0271881 A1* | 12/2005 | Hong | C08G 18/10 |
| | | | 528/49 |
| 2009/0197092 A1 | 8/2009 | Kendi et al. | |
| 2011/0003898 A1 | 1/2011 | Heckroth et al. | |
| 2014/0357828 A1 | 12/2014 | Eggert et al. | |
| 2014/0378611 A1 | 12/2014 | Nakao et al. | |
| 2016/0032142 A1 | 2/2016 | Huybrechts et al. | |
| 2016/0060380 A1 | 3/2016 | Laas et al. | |
| 2017/0306078 A1* | 10/2017 | Miyatake | C08G 18/60 |
| 2018/0002479 A1 | 1/2018 | Mager et al. | |
| 2019/0390065 A1* | 12/2019 | Nakao | C08G 18/3821 |

FOREIGN PATENT DOCUMENTS

| | | |
|---|---|---|
| EP | 1081171 | 3/2001 |
| JP | 03-043472 | 2/1991 |
| JP | 07-018056 | 1/1995 |
| JP | 07-082524 | 3/1995 |
| JP | 11-246646 | 9/1999 |
| JP | 2000-296362 | 10/2000 |
| JP | 2001-527222 | 12/2001 |
| JP | 2004-277498 | 10/2004 |
| JP | 2008-502773 | 1/2008 |
| JP | 2009-185288 | 8/2009 |
| JP | 2010-513691 | 4/2010 |
| JP | 2011-514819 | 5/2011 |
| JP | 2013-151645 | 8/2013 |
| JP | 2014-005364 | 1/2014 |
| JP | 2015-509090 | 3/2015 |
| JP | 2016-525379 | 8/2016 |
| WO | 99/32908 | 7/1999 |
| WO | 2006/007037 | 1/2006 |
| WO | 2008/076714 | 6/2008 |
| WO | 2014/190289 | 11/2014 |
| WO | WO 2016/063884 * | 4/2016 |
| WO | 2016/116376 A1 | 7/2016 |

OTHER PUBLICATIONS

International Search Report issued in International Pat. Appl. No. PCT/JP2018/007802, dated Jun. 5, 2018.

Written Opinion issued in International Pat. App. No. PCT/JP2018/007802, dated Jun. 5, 2018 with English translation.

Extract from an analysis of Desmodur® N 3400 from 2009, 13-C-NMR-Spectrum.

Melanie Decostanzi et al., "Reactivity and kinetics of HDI-iminooxadiazinedione: Application to polyurethane synthesis", European Polymer Journal 96, 2017, pp. 443, 446, 447.

Desmodur® N 3400, 2009, GPC.

Printout of Jul. 7, 2022 from the Internet, definition of "corrosion protection", https://www.chemie.de/lexikon/Korrosionsschutz.html, partial translation.

Excerpt from "Polyurethanes", Ulrich Meyer-Westhues, 2007, partial translation.

Opposition filed in EP Patent Application No. 18763807.7, dated Jul. 19, 2022, translation.

D6: Additional Experiment 1 for Main Request (Average number of isocyanate groups) submitted to European Patent Office on Feb. 15, 2023 in Opposition Proceeding in EP Patent No. 3594299, cited in Office Action issued in EP Patent Application No. 18763807.7 dated May 10, 2023.

D7: Additional Experiments for Auxiliary Request 3 (Viscosity) submitted to European Patent Office on Feb. 15, 2023 in Opposition Proceeding in EP Patent No. 3594299, cited in Office Action issued in EP Patent Application No. 18763807.7 dated May 10, 2023.

* cited by examiner

POLYASPARTIC COATING COMPOSITION, COATING FILM, AND COATED ARTICLE

TECHNICAL FIELD

The present invention relates to a polyaspartic coating composition, a coating film and a coated article.

Priority is claimed on Japanese Patent Application No. 2017-043141, filed Mar. 7, 2017 and Japanese Patent Application No. 2017-169741, filed Sep. 4, 2017, the content of which is incorporated herein by reference.

BACKGROUND ART

Among the polyurea coating compositions, polyaspartic coating compositions which are aliphatic polymers are formed from an aspartic acid ester compound having an amino group, and an aliphatic and/or alicyclic polyisocyanate composition having an isocyanate group. Polyaspartic coating compositions have been conventionally used in a wide range of applications such as various paints, flooring materials, waterproofing materials and the like, because yellowing of the coating film caused by ultraviolet exposure, which is a drawback of the aromatic polyurea coating composition, is greatly reduced.

An aspartic acid ester compound has a low viscosity compared with a polyol, which is a main component of the polyurethane coating composition, and since the dilution-solvent in the polyaspartic coating composition can be significantly reduced, it is possible to provide a high solid formulation or a solventless formulation. In addition, since there is high reactivity between the amino group of the aspartic acid ester compound and the isocyanate group of the aliphatic and/or alicyclic polyisocyanate, the curing speed of the polyaspartic coating composition is high even at room temperature compared with the polyurethane coating composition, and the mechanical strength is also excellent.

For example, Patent Document 1 discloses an aliphatic polyurea coating composition containing a polyamine component having a secondary amino group having an aspartic acid ester skeleton and a polyisocyanate component having an isocyanate group in an aliphatic polyisocyanate composition. The coating composition can be used without a high-pressure collision mixing sprayer because the pot life is relatively long and the coating film hardness is high.

PRIOR ART LITERATURE

Patent Documents

Patent document 1: Japanese Unexamined Patent Application, First Publication No. H3-43472

DISCLOSURE OF INVENTION

Problems to be Solved by the Invention

However, since the polyaspartic coating composition proposed in Patent Document 1 is hard, there is room for further improvement in scratch resistance of the coating film formed from the polyaspartic coating composition. In addition, since the average number of isocyanate groups in the aliphatic polyisocyanate is low, there is room for further improvement in curability, weather resistance and chemical resistance of the coating formed from the polyaspartic coating composition.

Therefore, it is an object of the present invention to provide a polyaspartic coating composition which has excellent scratch resistance and chemical resistance, and excellent weather resistance, while maintaining drying property and curing property.

Means for Solving the Problems

As a result of intensive studies, the inventors of the present invention discovered that a polyaspartic coating composition including one or two or more diisocyanate monomers selected from the group consisting of an aliphatic and alicyclic diisocyanate and a polyisocyanate obtained from a polyol containing a polycarprolactone polyol having a specific number-average molecular weight at a specific ratio, and further using a polyisocyanate component containing a specific amount or less of an isocyanurate trimer, has excellent scratch resistance and weather resistance while maintaining the drying property, thus completing the present invention.

That is, the present invention is as follows.

[1] A polyaspartic coating composition, comprising:

(A) an aspartic acid ester compound represented by the following formula (I):

[Chemical formula 1]

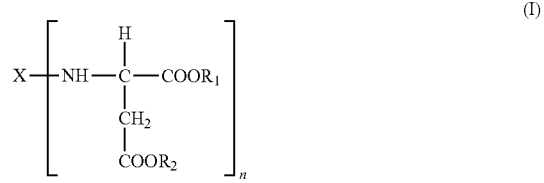

[in formula (I), X is an n-valent organic group obtained by removing a primary amino group of an n-valent polyamine, and $R_1$ and $R_2$ are the same or different organic groups which are inert to the isocyanate group under a reaction condition, and n is an integer of 2 or more], and (B) a polyisocyanate obtained by using one or two or more diisocyanate monomers selected from the group consisting of an aliphatic and alicyclic diisocyanate and a polycaprolactone polyol having a number-average molecular weight of 500 to 1,500, wherein a ratio of the polycaprolactone polyol to a total amount of the polyol is 20% by mass or more, and the polyisocyanate component contains 10.0% by mass or less of an isocyanurate trimer with respect to a total amount of the polyisocyanate component.

[2] The polyaspartic coating composition according to [1], wherein the polyol further contains a polyoxyalkylene polyol.

[3] The polyaspartic coating composition according to [2], wherein a ratio of the polyoxyalkylene polyol to a total amount of the polyoxyalkylene polyol and the polycaprolactone polyol is 80% by mass or less.

[4] The polyaspartic coating composition according to any one of [1] to [3], wherein an equivalent ratio between the amino group of (A) the aspartic acid ester compound and the isocyanate group of (B) the polyisocyanate component is amino group:isocyanate group =10:1 to 1:10.

[5] A polyaspartic coating composition, comprising:
   (A) an aspartic acid ester compound represented by the following general formula (I):

[Chemical formula 2]

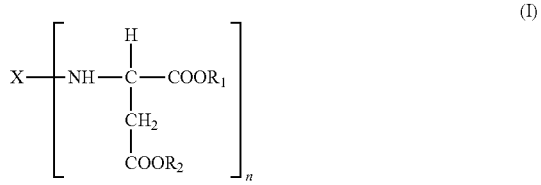

[in formula (I), X is an n-valent organic group obtained by removing a primary amino group of an n-valent polyamine, and $R_1$ and $R_2$ are the same or different organic groups which are inert to the isocyanate group under a reaction condition, and n is an integer of 2 or more], and
   (B') a polyisocyanate obtained by using one or two or more diisocyanate monomers selected from the group consisting of an aliphatic diisocyanate and an alicyclic diisocyanate, wherein
   an average number of isocyanate groups in the polyisocyanate component is 3.5 to 10.
[6] The polyaspartic coating composition according to [5], wherein a number-average molecular weight of (B') the polyisocyanate component is 700 to 3,500.
[7] The polyaspartic coating composition according to [5] or [6], wherein an equivalent ratio between the amino group of (A) the aspartic acid ester compound and the isocyanate group of (B') the polyisocyanate component is amino group:isocyanate group=10:1 to 1:10.
[8] The polyaspartic coating composition according to any one of [1] to [7], wherein the diisocyanate monomer contains a hexamethylene diisocyanate.
[9] A coating film formed from the polyaspartic coating composition defined in any one of [1] to [8].
[10] A coated article comprising the coating film defined in [9].
[11] Use of the polyaspartic coating composition defined in any one of [1] to [8] for heavy-duty anticorrosion coating.
[12] A method for preventing corrosion of a structure, comprising:
   coating a structure with the polyaspartic coating composition defined in any one of [1] to [8].

Effects of the Invention

According to the present invention, it is possible to provide a polyaspartic coating composition which has excellent scratch resistance and chemical resistance, and excellent weather resistance, while maintaining drying property and curability, and a coating film and a coated article using thereof. In addition, the polyaspartic coating composition of the present invention can also be used for heavy-duty anticorrosion coating.

BEST MODE FOR CARRYING OUT THE INVENTION

Hereinafter, embodiments for carrying out the present invention (hereinafter simply referred to as "the present embodiment") will be described in detail. The following embodiments are examples describing the present invention, although the present invention is not limited to the following embodiments. The present invention may also be implemented with appropriate modifications that fall within the scope of the invention.

<Polyaspartic Coating Composition>

The polyaspartic coating composition according to one embodiment of the present invention includes:
   (A) an aspartic acid ester compound represented by the following formula (I):

[Chemical formula 3]

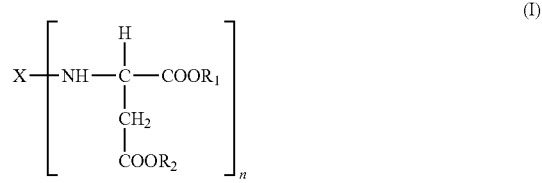

[in formula (I), X is an n-valent organic group obtained by removing a primary amino group of an n-valent polyamine, $R_1$ and $R_2$ are the same or different isocyanate groups which are inert to the isocyanate group under a reaction condition, and n is an integer of 2 or more],
   (B) a polyisocyanate obtained by using one or two or more diisocyanate monomers selected from the group consisting of an aliphatic and alicyclic diisocyanate, and a polyol containing a polycaprolactone polyol having a number-average molecular weight of 500 to 1,500,
   wherein a ratio of the polycaprolactone polyol to the total amount of the polyol is 20.0% by mass or more, and
   the polyisocyanate component contains 10.0% by mass or less of an isocyanurate trimer with respect to the total amount of the polyisocyanate components.

The equivalent ratio between the amino group of (A) the aspartic acid ester compound and the isocyanate group of (B) the polyisocyanate component is preferably amino group:isocyanate group=10:1 to 1:10, more preferably amino group:isocyanate group=5:1 to 1:5, and even more preferably amino group:isocyanate group=2:1 to 1:2.

When the equivalent ratio between the amino group of (A) the aspartic acid ester compound and the isocyanate group of (B) the polyisocyanate component is amino group: isocyanate group=10:1 or more, the drying property tends to be better.

When the equivalent ratio between the isocyanate group and the amino group is amino group:isocyanate group=1:10 or less, the scratch resistance and the weather resistance of the coating film using the polyaspartic coating composition of the present embodiment tend to be improved.

The polyaspartic coating composition according to one embodiment of the present invention includes:
   (A) an aspartic acid ester compound represented by the following general formula (I):

[Chemical formula 4]

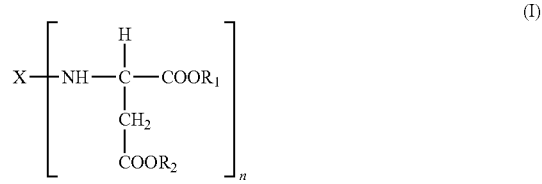

[in formula (I), X is an n-valent organic group obtained by removing a primary amino group of an n-valent polyamine, and $R_1$ and $R_2$ are the same or different groups which are inert to the isocyanate group under a reaction condition, and n is an integer of 2 or more.]

(B') a polyisocyanate component containing a polyisocyanate obtained by using one or two or more diisocyanate monomers selected from the group consisting of an aliphatic diisocyanate and an alicyclic diisocyanate;

wherein an average number of isocyanate groups of (B') the polyisocyanate component is 3.5 to 10.

The polyaspartic coating composition of the present embodiment has a high average number of isocyanate groups derived from polyisocyanates. Therefore, the coating film formed using the polyaspartic coating composition of the present embodiment has excellent curability, weather resistance and chemical resistance.

The components of the polyaspartic coating composition of the present invention will be described in detail below.

<<Components>>

((A) Aspartic Acid Ester Compound)

(A) the aspartic acid ester compound contained in the polyaspartic coating composition of the present embodiment is a compound represented by the above general formula (I) (aspartic acid compound (I)).

(X)

In the general formula (I), X is an n-valent organic group.

The n-valent organic group may be an aliphatic group or an aromatic group. The aliphatic group may be linear, branched or cyclic. Also, n is an integer of 2 or more as described later.

Examples of the linear or branched aliphatic group include an alkanediyl group (alkylene group), an alkylidene group, an alkylidine group and the like.

Examples of the cyclic aliphatic group include a cycloalkylene group and the like.

Examples of the aromatic group include arylene groups such as a phenylene group or the like.

More specifically, X is preferably a linear, branched or cyclic divalent aliphatic group having 2 to 20 carbon atoms, from the viewpoint of yellowing resistance of the polyaspartic coating composition of the present embodiment. Examples of the linear, branched or cyclic divalent aliphatic group having 2 to 20 carbon atoms include an n-butylene group, n-pentylene group, n-hexylene group, 2,2,4-trimethylhexamethylene group, 2,4,4-trimethylhexamethylene group, 3,3,5-trimethyl-5-methylcyclohexylene group, dicyclohexyl methylene group, 3,3'-Dimethyldicyclohexylmethylene group and the like.

($R_1$) and $R_2$)

In the general formula (I), $R_1$ and $R_2$ are each independently an organic group which is inert to the isocyanate group under a reaction condition.

In the present description, the term "inert to the isocyanate group under a reaction condition" means that $R_1$ and $R_2$ are a Zerewitinoff-active hydrogen-containing group (CH acidic compound) such as a hydroxyl group, an amino group or a thiol group.

It is preferable that $R_1$ and $R_2$ be each independently an alkyl group having 1 to 10 carbon atoms, and more preferably a methyl group, an ethyl group, a propyl group or a butyl group.

$R_1$ and $R_2$ may be the same or different.

(n)

In the general formula (I), n is an integer of 2 or more.

Among them, n is preferably an integer of 2 to 6, more preferably an integer of 2 to 4, even more preferably 2 or 3, and particularly preferably 2.

((A) Method for Producing Aspartic Acid Ester Compound)

The aspartic acid ester compound (I) contained in the polyaspartic coating composition of the present embodiment can be obtained, for example, by reacting a primary polyamine represented by the following general formula (I-1) (hereinafter, may be referred to as "primary polyamine (I-1)"); and a maleic acid ester or fumaric acid ester (hereinafter, may be referred to as "compound (I-2)") represented by the following general formula (I-2).

[Chemical Formula 5]

X—[NH$_2$]$_n$ (I-1)

R$_1$OOC—CH=CH—COOR$_2$ (I-2)

[In the formula, X, $R_1$, $R_2$ and n are as defined in the above general formula (I).]

The primary polyamine (I-1) is not particularly limited, and examples thereof include an n-valent polyamine.

Examples of the n-valent polyamine include diamines such as an ethylene diamine, 1,2-diaminopropane, 1,4-diaminobutane, 1,5-diaminopentane, 1,6-diaminohexane, 2,5-diamino-2,5-dimethyl hexane, 2,2,4-trimethyl-1,6-diaminohexane, 2,4,4-Trimethyl-1,6-diaminohexane, 1,11-diaminoundecane, 1,12-diaminododecane, 1-amino-3,3,5-trimethyl-5-aminomethylcyclohexane, 2,4-hexahydrotolylenediamine, 2,6-hexahydrotolylenediamine, 2,4'-diaminodicyclohexylmethane, 4,4'-diaminodicyclohexylmethane, 3,3'-dimethyl-4,4'-diaminodicyclohexylmethane or the like; 2,4,4'-triamino-5-methyldicyclohexylmethane; a polyether polyamine having a number-average molecular weight of 148 to 6,000 and having a primary amino group aliphatically bonded thereto. The n-valent polyamine is not limited to these examples.

Among the examples, the n-valent polyamine is preferably a diamine, and more preferably 1,4-diaminobutane, 1,5-diaminopentane, 1,6-diaminohexane, 2,2,4-trimethyl-1,6-diaminohexane, 2,4,4-Trimethyl-1,6-diaminohexane, 1-amino-3,3,5-trimethyl-5-aminomethylcyclohexane, 4,4'-diaminodicyclohexylmethane or 3,3'-dimethyl-4,4'-diaminodicyclohexylmethane.

The compound (I-2) is not particularly limited, and examples thereof include a dimethyl maleate, diethyl maleate, dibutyl maleate, dimethyl fumarate, diethyl fumarate, dibutyl fumarate and the like.

In the method for producing an aspartic acid ester compound, the reaction temperature is preferably 0 to 100° C.

The compounding ratio between the primary polyamine (I-1) and the maleic acid ester or fumaric acid ester (I-2) may be such that the maleic acid ester or fumaric acid ester (I-2) is compounded so that at least one, preferably only one olefin double bond is present with respect to the primary amino group of the primary polyamine (I-1).

In addition, after the reaction of the primary polyamine (I-1) with the maleic acid ester or fumaric acid ester (I-2), if necessary, the excessive primary polyamine (I-1) and the maleic acid ester or fumaric acid ester (I-2) can be removed by distillation.

In addition, the reaction of the primary polyamine (I-1) with the maleic acid ester or fumaric acid ester (I-2) may be carried out in bulk or in a suitable solvent (for example, methanol, ethanol, propanol, dioxane, and mixtures thereof, or the like).

((B) Polyisocyanate Component)

The polyisocyanate component (B) used in this embodiment include a polyisocyanate obtained by using one or two or more diisocyanate monomers selected from the group consisting of an aliphatic and alicyclic diisocyanate and a polycaprolactone polyol having a number-average molecular weight of 500 to 1,500, wherein a ratio of the polycaprolactone polyol to the total amount of the polyol is 20% by mass or more, and the polyisocyanate component contains 10.0% by mass or less of an isocyanurate trimer with respect to a total amount of the polyisocyanate component.

The ratio of the polycaprolactone polyol to the total amount of the polyol is preferably 30% by mass or more, more preferably 40% by mass or more, and even more preferably 50% by mass or more. When the ratio is 20% by mass or more, the weather resistance of the coating film using the polyaspartic coating composition of the present embodiment tends to be improved. The ratio can be measured by the method described later in the Examples.

The polyol in the present embodiment may further contain a polyoxyalkylene polyol. The ratio of the polyoxyalkylene polyol to the total amount of the polyoxyalkylene polyol and the polycaprolactone polyol is preferably 80% by mass or less (that is, 0% by mass, or more than 0% by mass to 80% by mass, the same applies hereinafter). It is more preferably 70% by mass or less, even more preferably 60% by mass or less, and still even more preferably 50% by mass or less. When the ratio is 80% by mass or less, the weather resistance of the coating film using the polyaspartic coating composition of the present embodiment tends to be improved. The ratio can be measured by the method described later in the Examples.

The isocyanate content (hereinafter, may also referred to as "NCO content") of the polyisocyanate component (B) used in the present embodiment is preferably 5 to 30% by mass with respect to the total amount (100% by mass) of the polyisocyanate component. The lower limit of the NCO content is more preferably 6% by mass, and even more preferably 7% by mass. The upper limit of the NCO content is more preferably 25% by mass, and even more preferably 20% by mass. When the NCO content is 5% by mass or more, the drying property and the curability tend to be further maintained. When the NCO content is 30% by mass or less, the scratch resistance of the coating film using the polyaspartic coating composition of the present embodiment tends to be improved. The NCO content can be measured by the method described later in the Examples.

The viscosity at 25° C. of the polyisocyanate component (B) used in the present embodiment is preferably 500 to 50,000 mPa·s. The lower limit of the viscosity is more preferably 1,000 mPa·s, even more preferably 1,500 mPa·s, and still even more preferably 2,000 mPa·s. The upper limit of the viscosity is more preferably 40,000 mPa·s, even more preferably 30,000 mPa·s, and still even more preferably 25,000 mPa·s. When the viscosity is 500 mPa·s or more, the scratch resistance of the coating film using the polyaspartic coating composition of the present embodiment tends to be improved. When the viscosity is 50,000 mPa·s or less, the drying property tends to be further maintained. The viscosity can be measured by the method described later in the Examples.

The number-average molecular weight of the polyisocyanate component (B) used in the present embodiment is preferably 600 to 5,000. The lower limit of the number-average molecular weight is more preferably 800, even more preferably 1,000, and still even more preferably 1,200. The upper limit of the number-average molecular weight is more preferably 4,000, even more preferably 3,000, and still even more preferably 2,000. When the number-average molecular weight is 600 or more, the scratch resistance of the coating film using the polyaspartic coating composition of the present embodiment tends to be improved. When the number-average molecular weight is 5,000 or less, the drying property tends to be further maintained. The number-average molecular weight can be measured by the method described later in the Examples.

The average number of isocyanate groups of the polyisocyanate component (B) used in the present embodiment is preferably 2.0 to 10.0. The lower limit of the average number of isocyanate groups is more preferably 2.2, even more preferably 2.4, even more preferably 2.6, and still even more preferably 2.8. The upper limit of the average number of isocyanate groups is more preferably 9.0, even more preferably 8.0, and still even more preferably 7.0. When the average number of isocyanate groups is 2.0 or more, the drying property tends to be further maintained. When the average number of isocyanate groups is 10.0 or less, the scratch resistance and the weather resistance of the coating film using the polyaspartic coating composition of the present embodiment tend to be improved. The average number of isocyanate groups can be measured by the method described later in the Examples.

The mass concentration of the diisocyanate monomer of the polyisocyanate component (B) used in the present embodiment is preferably 1.0% by mass or less, more preferably 0.5% by mass or less, even more preferably 0.3% by mass or less, with respect to the total amount (100% by mass) of the polyisocyanate component.

When the mass concentration of the diisocyanate monomer is 1.0% by mass or less, the drying property tends to be further maintained. The mass concentration of the diisocyanate monomer can be measured by the method described later in the Examples.

The content of the isocyanurate trimer of the polyisocyanate component (B) used in the present embodiment is 10% by mass or less (that is, 0% by mass or more than 0% to 10% by mass, the same applies hereinafter) with respect to the total amount (100% by mass) of the polyisocyanate component. It is preferably 8.0% by mass or less, more preferably 6.0% by mass or less, and even more preferably 4.0% by mass or less. When the content of the isocyanurate trimer is 10% by mass or less, the scratch resistance of the coating film using the polyaspartic coating composition of the present embodiment tends to be improved. The content of the isocyanurate trimer can be measured by the method described later in the Examples.

Diisocyanate Monomer

The diisocyanate monomer used in the present embodiment is selected from the group consisting of an aliphatic and alicyclic diisocyanate.

Although the aliphatic diisocyanate used in the present embodiment is not particularly limited, is is preferably an aliphatic diisocyanate having 4 to 30 carbon atoms, and examples thereof include a tetramethylene diisocyanate, pentamethylene diisocyanate and hexamethylene diisocyanate (hereinafter referred to as "HDI"), 2,2,4-trimethyl-1,6-hexamethylene diisocyanate, and lysine diisocyanate. Among the examples, HDI is more preferable in terms of industrial availability. The aliphatic diisocyanates described above may be used alone or in combination of two or more thereof.

Although the alicyclic diisocyanate used in the present embodiment is not particularly limited, it is preferably an alicyclic diisocyanate having 8 to 30 carbon atoms, and examples thereof include an isophorone diisocyanate (hereinafter referred to as "IPDI"), 1,3-bis (isocyanatomethyl)-cyclohexane, 4,4'-dicyclohexylmethane diisocyanate, norbornene diisocyanate, and hydrogenated xylylene diisocyanate. Among the examples, IPDI is more preferable in terms of weatherability and industrial availability. The alicyclic diisocyanates described above may be used alone or in combination of two or more thereof.

As the diisocyanate monomer, one or two or more of aliphatic diisocyanates and one or two or more of alicyclic diisocyanates may be used in combination.

Polycaprolactone Polyol

The polycaprolactone polyol used in the present embodiment is a di- to tetravalent polyol having a number-average molecular weight of 500 to 1,500 and a repeating unit represented by $-O(CH_2)_5CO-$, and can be derived from the following alcohols with ε-caprolactone and the like. In addition, although not particularly limited, for example, it can be obtained by a ring-opening polymerization of ε-caprolactone or the like in the presence of a catalyst using a dihydric to tetrahydric alcohol as an initiator.

As the initiator, dihydric alcohols such as an ethylene glycol, propylene glycol, 1,3-butylene glycol, neopentyl glycol or the like; trihydric alcohols such as a trimethylene glycol, glycerin or the like; tetrahydric alcohols such as a pentaerythritol or the like; may be used. In terms of obtaining a low viscosity polyisocyanate component, polyhydric alcohols having a branch are preferable.

As the catalyst, organic titanium-based compounds such as a tetrabutyl titanate, tetrapropyl titanate, tetraethyl titanate or the like, tin-based compounds such as a stannous octoate, dibutyltin oxide, dibutyltin laurate, stannous chloride, stannous bromide, or the like may be preferably used. In terms of adjusting the caprolactone dimer content to the range defined in the present application, tin-based compounds are preferable.

In the ring-opening polymerization of ε-caprolactone and the like, it is preferable that ε-caprolactone and the above-mentioned initiator be charged in a nitrogen gas atmosphere with a molar ratio set so as to obtain a predetermined molecular weight, and 0.1 to 100 ppm of the catalyst with respect to ε-caprolactone be further added to react at a temperature of 150 to 200° C. for 4 to 10 hours. However, it is important to control the caprolactone dimer content to be 100 1000 ppm at the end of the reaction. If necessary, the caprolactone dimer may be removed from the produced polycaprolactone polyol by a method such as extraction or distillation.

In addition to ε-caprolactone, other cyclic lactones such as a trimethylcaprolactone or valerolactone may be partially mixed.

Polyoxyalkylene Polyol

The polyoxyalkylene polyol used in the present embodiment is a di- to tetravalent polyol having a number-average molecular weight of 500 to 1,500 and a repeating unit represented by $-O(CH_2)_n-$, and can be derived from a di- to tetrahydric alcohol with ethylene oxide, propylene oxide, tetrahydrofuran or the like. In addition, although not particularly limited, for example, it can be obtained by cationic polymerization of ethylene oxide, propylene oxide, tetrahydrofuran or the like polymerization in the presence of a catalyst using a di- to tetrahydric alcohol as an initiator.

As the initiator, dihydric alcohols such as an ethylene glycol, propylene glycol, 1,3-butylene glycol, neopentyl glycol or the like; trihydric alcohols such as a trimethylene glycol, glycerin or the like; tetrahydric alcohols such as a pentaerythritol or the like; may be used. In terms of obtaining a low viscosity polyisocyanate component, polyhydric alcohols having a branch are preferable.

As the catalyst, hydroxides of lithium, sodium, potassium and the like, and strongly basic catalysts such as an alcoholate, alkylamine or the like can be used.

The cationic polymerization of ethylene oxide, propylene oxide, tetrahydrofuran or the like is preferably carried out in such a manner that ethylene oxide, propylene oxide, tetrahydrofuran or the like and the above-described initiator are charged in a nitrogen gas atmosphere with a molar ratio so as to have a predetermined molecular weight, and then 0.1 to 100 ppm of the catalyst is further added to the ethylene oxide, propylene oxide, tetrahydrofuran or the like to carry out the reaction at a temperature of 150 to 200° C. for 4 to 10 hours.

((B) Method for Producing Polyisocyanate Component)

The method for producing the polyisocyanate component used in the present embodiment will be described. The polyisocyanate component used in the present embodiment can be obtained in such a manner that a urethanization reaction for forming a urethane group is carried out by reacting the isocyanate group of the diisocyanate monomer with the hydroxyl group of the polycaprolactone polyol and/or the polyoxyalkylene polyol in the presence of an excess of the diisocyanate monomer, followed by removing unreacted diisocyanate monomer.

The urethanization reaction temperature is preferably 50 to 160° C., more preferably 60 to 120° C. When the urethanization reaction temperature is 160° C. or lower, coloring of polyisocyanate and the like tend to be effectively suppressed. The urethanization reaction time is preferably 30 minutes to 4 hours, more preferably 1 to 3 hours, and even more preferably 1 to 2 hours.

The equivalent ratio between the isocyanate group of the diisocyanate monomer and the hydroxyl group of the polycaprolactone polyol and/or the polyoxyalkylene polyol is preferably isocyanate group:hydroxy group=2:1 to 50:1. When the equivalent ratio is isocyanate group:hydroxyl group=2:1 or more, the aliphatic and/or alicyclic polyisocyanate component tends to be able to develop a low viscosity suitable for high solid formulation or solventless formulation. When the equivalent ratio is isocyanate group:hydroxyl group=50:1 or less, the yield of polyisocyanate tends to be increased.

In addition, the polyisocyanate component used in the present embodiment can be obtained by carrying out an isocyanuration reaction to form an isocyanurate group, an iminooxadiazine dione-forming reaction to form an iminooxadiazine dione group, a uretdione-forming reaction to form a uretdione group, an allophanatization reaction to form an allophanate group at once in the presence of an excess of a diisocyanate monomer, and removing the unreacted diisocyanate monomer after completion of the reaction. Alternatively, the above-described reactions may be carried out separately, and the obtained polyisocyanates may be mixed at a specific ratio. Here, from the viewpoint of simplicity of production, it is preferable to carry out the above-described reaction at once to obtain a polyisocyanate, and from the viewpoint of freely adjusting the molar ratio of each functional group, it is preferable to separately produce and then mix together.

Examples of the catalyst for deriving a polyisocyanate containing an isocyanurate group from a diisocyanate monomer include the generally used isocyanuration reaction catalysts. Although the isocyanuration reaction catalyst is not particularly limited, generally a catalyst with basicity is preferable and the examples thereof include, (1) hydrochlorides of tetraalkyl ammonium such as a tetramethyl ammonium, tetraethyl ammonium, tetrabutyl ammonium or the like; organic weak acid salts such as an acetate, octylate, myristate, benzoate or the like; (2) hydroxides of hydroxyalkyl ammonium such as a trimethyl hydroxyethyl ammonium, trimethyl hydroxypropyl ammonium, triethyl hydroxyethyl ammonium, triethyl hydroxypropyl ammonium or the like; organic weak acid salts such as an acetate thereof, octylate thereof, myristate thereof, benzoate thereof or the like salt; (3) metal salts such as a tin, zinc and lead salts of alkyl carboxylic acids such as an acetic acid, caproic acid, octylic acid, myristic acid or the like; (4) metal alcoholates such as a sodium and potassium alcoholates or the like; (5) compounds containing an aminosilyl group such as a hexamethylenedisilazane or the like; (6) mannich bases; (7) combined use of tertiary amines and epoxy compounds; (8) phosphorus-based compounds such as a tributylphosphine or the like.

Among the examples, from the viewpoint of suppressing the production of unwanted by-products, an organic weak acid salt of a quaternary ammonium is preferable, and an organic weak acid salt of tetraalkylammonium is more preferable.

The above-mentioned isocyanuration reaction catalyst is preferably 10 ppm by mass or more and 1000 ppm by mass or less with respect to the mass of the diisocyanate monomer charged. The upper limit is more preferably 500 ppm by mass, and even more preferably 100 ppm by mass. In addition, the isocyanuration reaction temperature is preferably 50 to 120° C. or lower, and more preferably 60 to 90° C. When the isocyanuration reaction temperature is 120° C. or lower, coloring of polyisocyanate or the like tends to be effectively suppressed.

Although the isocyanuration reaction is not particularly limited by the desired conversion rate (mass ratio of the polyisocyanate produced in the isocyanuration reaction to the charged diisocyanate monomer), it can be controlled by stopping the isocyanuration reaction by addition of acidic compounds such as a phosphoric acid, acidic phosphoric acid ester or the like. In addition, in order to obtain the polyisocyanate used in the present embodiment, it is necessary to stop the progress of the reaction at an initial stage.

However, since the initial reaction rate of the isocyanuration reaction is very high, it is difficult to stop the progress of the reaction at the initial stage, and thus it is necessary to carefully select the reaction conditions, particularly the addition amount and addition method of the catalyst.

For example, a method of dividing and adding the catalyst every predetermined time is recommended as a suitable method.

Therefore, the conversion rate of the isocyanuration reaction for obtaining the polyisocyanate component used in the present embodiment is preferably 30% or less, more preferably 25% or less, and even more preferably 20% or less.

When the conversion rate of the isocyanuration reaction is 30% or less, the aliphatic and/or alicyclic polyisocyanate component tends to develop a low viscosity suitable for high solids formulations and solventless formulations.

Although the catalyst for deriving a polyisocyanate containing an iminooxadiazine dione group from a diisocyanate monomer is not particularly limited, for example, the following catalyst (1) or (2) which is generally known as an iminooxadiazine dione-forming reaction catalyst can be used.

(1) (Poly) hydrogen fluorides represented by a general formula $M[F_n]$ or a general formula $M[F_n(HF)_m]$ (wherein, m and n are integers that satisfy the relationship of $m/n>0$, and M is a cation (mixture) with n charge, or one or more radicals having a total valency of n) such as a tetramethylammonium fluoride hydrate, tetraethylammonium fluoride or the like;

(2) Compounds composed of 3,3,3-trifluorocarboxylic acid, 4,4,4,3,3-pentafluorobutanoic acid, 5,5,5,4,4,3,3-heptafluoropetnaoic acid, a compound composed of a general formula $R_1$—$C(R'_2)$—$C(O)O$— or a general formula $R_2$=$CR'$—$C(O)O$— (wherein, $R_1$ and $R_2$ are optionally branched, cyclic and/or unsaturated perfluoroalkyl groups of having 1 to 30 carbon atoms, R' represents a hydrogen atom or a group selected from the group consisting of alkyl groups and aryl groups having 1 to 20 carbon atoms and optionally including a hetero atom, and the plurality of R' may be the same or different) and either a quaternary ammonium cation or a quaternary phosphonium cation, such as a 3,3-difluoropropan-2-enoic acid or the like.

From the viewpoint of ease of availability, the above (1) is preferable, from the viewpoint of safety, the above (2) is preferable.

The above-mentioned iminooxadiazine dione-forming reaction catalyst is preferably 10 to 1000 ppm by mass with respect to the mass of the diisocyanate monomer charged.

The lower limit is more preferably 20 ppm by mass, even more preferably 40 ppm by mass, and still even more preferably 80 ppm by mass.

The upper limit is more preferably 800 ppm by mass, even more preferably 600 ppm by mass, and still even more preferably 500 ppm by mass or less.

Moreover, an imino oxadiazine dione-forming reaction temperature is preferably 40 to 120° C.

The lower limit is more preferably 50° C., even more preferably 55° C. The upper limit is more preferably 100° C., even more preferably 90° C., and still even more preferably 80° C.

When the iminooxadiazine dione-forming reaction temperature is 40° C. or higher, it is possible to keep the reaction rate high. When the iminooxadiazine dione-forming reaction temperature is 120° C. or lower, coloring of the polyisocyanate tends to be effectively suppressed.

The catalyst for deriving a polyisocyanate containing uretdione groups from a diisocyanate monomer is not particularly limited, and the examples thereof include tertiary phosphines, for example, trialkyl phosphines such as a tri-n-butyl phosphine, tri-n-octyl phosphine or the like; tris-(dialkylamino) phosphines such as a tris-(dimethylamino) phosphine or the like; and cycloalkyl phosphines such as a cyclohexyl-di-n-hexylphosphine or the like.

Many of the above-mentioned uretdione-forming reaction catalysts simultaneously promote the isocyanuration reaction, and thus an isocyanurate group-containing polyisocyanate is produced in addition to the uretdione group-containing polyisocyanate. Although it is not particularly limited, the uretdione-forming reaction may be stopped by adding a deactivating agent of the uretdione-forming reaction catalyst such as a phosphoric acid, methyl p-toluenesulfonate or the like when reaching a desired conversion rate (mass ratio of the polyisocyanate produced in the uretdione-forming reaction to the charged diisocyanate monomer). After stopping the reaction, if necessary, filtration may be performed.

Moreover, the uretdione group can also be obtained by heating a diisocyanate monomer, without using the uretdione-forming reaction catalyst mentioned above. The temperature of the uretdione-forming reaction is preferably 120° C. or higher, more preferably 130 to 170° C., and even more preferably 140 to 160° C. In addition, the uretdione-forming reaction time is preferably 30 minutes to 4 hours, more preferably 1 to 3 hours, and even more preferably 1 to 2 hours.

The catalyst for deriving the polyisocyanate containing allophanate group from the diisocyanate monomer is not particularly limited, and examples thereof include tin, lead, zinc, bismuth, zirconium or zirconyl salt of alkyl carboxylic acids, or the like; organic tin compounds such as a tin 2-ethylhexanoate, dibutyltin dilaurate; organic lead compounds such as a lead 2-ethylhexanoate; organic zinc compounds such as a zinc 2-ethylhexanoate; bismuth 2-ethylhexanoate; zirconium 2-ethylhexanoate, and zirconyl 2-ethylhexanoate. These examples may be used alone or in combination of two or more thereof.

In addition, the above-mentioned isocyanuration reaction catalyst can be used as an allophanatization catalyst. When the allophanatization reaction is carried out using the above-mentioned isocyanuration reaction catalyst, of course, an isocyanurate group-containing polyisocyanate is also produced. It is preferable that the allophanatization reaction and the isocyanuration reaction be carried out using the above-described isocyanuration reaction catalyst as the allophanatization reaction catalyst in terms of economical production.

The above-mentioned allophanatization reaction catalyst is preferably 10 to 1000 ppm by mass with respect to the mass of the diisocyanate monomer charged.

The lower limit is more preferably 20 ppm by mass, even more preferably 40 ppm by mass, and still even more preferably 80 ppm by mass.

The upper limit is more preferably 800 ppm by mass, even more preferably 600 ppm by mass, and still even more preferably 500 ppm by mass or less.

In addition, the allophanatization reaction temperature is preferably 40 to 180° C. The lower limit is more preferably 60° C., even more preferably 80° C., and still even more preferably 100° C. The upper limit is more preferably 160° C., even more preferably 140° C.

When the allophanatization reaction temperature is 40° C. or higher, it is possible to keep the reaction rate high. When the allophanatization reaction temperature is 180° C. or lower, coloring of polyisocyanate and the like tend to be effectively suppressed.

The alcohol which can be used to form the allophanate group is preferably an alcohol formed only of carbon, hydrogen and oxygen, more preferably a monoalcohol, and even more preferably a monoalcohol having a molecular weight of 200 or less. Although the specific compound is not particularly limited, examples thereof include monoalcohols such as a methanol, ethanol, propanol, butanol, pentanol, hexanol, heptanol, octanol, nonanol or the like; diols such as an ethylene glycol, 1,3-butanediol, neopentyl glycol, 2-ethylhexanediol or the like. These examples may be used alone or in combination of two or more thereof.

The above-mentioned isocyanuration reaction, iminooxadiazine dione-forming reaction, uretdione-forming reaction, and the allophanatization reaction can be performed sequentially, or some of them can be performed in parallel. It is preferable to carry out the isocyanuration reaction and then carry out the uretdione-forming reaction. It is more preferable to carry out the isocyanuration reaction and then carry out the uretdione-forming reaction by heat, since the production process can be simplified.

From the reaction solution after completion of the reaction, unreacted diisocyanate monomer can be removed by thin film distillation, extraction or the like to obtain the polyisocyanate used in the present embodiment.

To the obtained polyisocyanate, for example, an antioxidant or a UV absorber may be added for the purpose of suppressing coloring during the storage. Examples of the antioxidant include hindered phenols such as a 2,6-di-t-butyl-p-cresol or the like, and examples of the ultraviolet absorber include benzotriazole, benzophenone or the like. These examples may be used alone or in combination of two or more thereof. The addition amounts thereof are preferably 10 to 500 ppm by mass.

((B') Polyisocyanate Component)

(B') the polyisocyanate component contained in the polyaspartic coating composition of the present embodiment contains a polyisocyanate. The polyisocyanate is a polyisocyanate obtained by using one or more diisocyanates selected from the group consisting of an aliphatic diisocyanate and an alicyclic diisocyanate. Moreover, the isocyanate group average number of (B') the polyisocyanate component is 3.5 10.

The term "polyisocyanate obtained from diisocyanate" as used herein means a reaction product (polyisocyanate) having a plurality of isocyanate groups obtained by bonding a plurality of diisocyanates.

Moreover, (B') the polyisocyanate component may contain one type of polyisocyanate, and may also contain two or more types of polyisocyanates.

Although the aliphatic diisocyanate is not particularly limited, an aliphatic diisocyanate having 4 to 30 carbon atoms is preferable. Specific examples of the aliphatic diisocyanates include tetramethylene diisocyanate, pentamethylene diisocyanate, hexamethylene diisocyanate (hereinafter sometimes referred to as "HDI"), 2,2,4-trimethyl-1,6-hexamethylene diisocyanate, lysine diisocyanate and the like. These aliphatic diisocyanates may be used alone or in combination of two or more thereof.

Among the examples, from the viewpoint of industrial availability, HDI is preferable as the aliphatic diisocyanate.

Although the alicyclic diisocyanate is not particularly limited, an alicyclic diisocyanate having 8 to 30 carbon atoms is preferable. Specific examples of the alicyclic diisocyanates include isophorone diisocyanate (hereinafter sometimes referred to as "IPDI"), 1,3-bis (isocyanatomethyl)-cyclohexane, 4,4'-dicyclohexylmethane diisocyanate, norbornene diisocyanate, hydrogenated xylylene diisocyanate and the like. These alicyclic diisocyanates may be used alone or in combination of two or more thereof.

Among the examples, from the viewpoint of weather resistance of the obtained coating film and ease of industrial availability, IPDI is preferable as the alicyclic diisocyanate.

Moreover, it is also allowable that one or two or more aliphatic diisocyanates be used in combination with one or two or more alicyclic diisocyanates.

(Method for Producing (B') Polyisocyanate Component)

The method for producing the polyisocyanate contained in (B') the polyisocyanate component will be described in detail below.

The polyisocyanate contained in (B') the polyisocyanate component can be obtained by performing, for example, an isocyanuration reaction to form an isocyanurate group, iminooxadiazine dione-forming reaction to form an iminooxadiazine dione group, a uretdione-forming reaction to form a uretdione group and an allophanatization reaction to form an allophanate group at once in the presence of excess diisocyanate and removing the unreacted diisocyanate after completion of the reaction. That is, the polyisocyanate obtained by the above reaction is a reaction product in which a plurality of the above diisocyanates are bonded and having at least one selected from the group consisting of an isocyanurate group, an iminooxadiazine dione group, a uretdione group and an allophanate group.

Alternatively, the above reactions may be carried out separately, and the polyisocyanates obtained may be mixed at a specific ratio.

From the viewpoint of simplicity of production, it is preferable to carry out the above reactions at once to obtain a polyisocyanate, and from the viewpoint of freely adjusting the molar ratio of each functional group, it is preferable to separately produce and then mix together.

Isocyanuration Reaction

The catalyst for deriving polyisocyanate containing an isocyanurate group from diisocyanates includes generally used isocyanuration reaction catalysts.

Although the isocyanuration reaction catalyst is not particularly limited, generally a catalyst with basicity is preferable. Specific examples of the isocyanuration reaction catalyst include the following:

(1) hydroxides of a tetraalkylammonium ion such as a tetramethylammonium, tetraethylammonium or tetrabutylammonium ion; and organic weak acid salts thereof such as acetates, octylates, myristates and benzoates;

(2) hydroxides of a hydroxyalkylammonium ion such as a trimethylhydroxyethylammonium, trimethylhydroxypropylammonium, triethylhydroxyethylammonium or triethylhydroxypropylammonium ion; and organic weak acid salts thereof such as acetates, octylates, myristates and benzoates;

(3) metal salts such as tin, zinc and lead salts of alkylcarboxylic acids such as an acetic acid, caproic acid, octylic acid and myristic acid;

(4) metal alcoholates such as sodium and potassium alcoholates;

(5) aminosilyl group-containing compounds such as a hexamethylenedisilazane.

(6) mannich bases;

(7) combinations of a tertiary amine and an epoxy compound; and (8) phosphorus-based compounds such as a tributylphosphine.

Among the examples, from the viewpoint of suppressing the production of unwanted by-products, the isocyanuration reaction catalyst is preferably an organic weak acid salt of a quaternary ammonium, and more preferably an organic weak acid salt of a tetraalkylammonium.

The upper limit of the amount of the isocyanuration reaction catalyst mentioned above is preferably 1000 ppm by mass or less, more preferably 500 ppm by mass or less, and even more preferably 100 ppm by mass or less, with respect to the mass of the charged diisocyanate.

On the other hand, although the lower limit of the amount of the isocyanuration reaction catalyst used is not particularly limited, for example, it may be 10 ppm by mass or more.

The isocyanuration reaction temperature is preferably 50 to 120° C., and more preferably 60 to 90° C. When the isocyanuration reaction temperature is less than or equal to the above upper limit, coloring of polyisocyanate or the like tends to be suppressed more effectively.

The isocyanuration reaction is stopped by the addition of acidic compounds (for example, phosphoric acid, acidic phosphoric acid ester or the like) at the time when the conversion rate (mass ratio of the polyisocyanate produced in the isocyanuration reaction to the mass of the diisocyanate charged) reaches a desired conversion rate.

In addition, in order to obtain a polyisocyanate, it is necessary to stop the progress of the reaction at the beginning However, since the initial reaction rate of the isocyanuration reaction is very high, it is difficult to stop the progress of the reaction at the initial stage, and thus it is necessary to carefully select the reaction conditions, particularly the amount and addition method of the catalyst. For example, a method of dividing and adding the catalyst every predetermined time is recommended as a suitable method.

Therefore, the conversion rate of the isocyanuration reaction for obtaining a polyisocyanate is preferably 30% or less, more preferably 25% or less, and even more preferably 20% or less.

When the conversion rate of the isocyanuration reaction is less than or equal to the above upper limit, the viscosity of the isocyanate component containing polyisocyanate can be lowered, and it can be applied to high solids formulations and solventless formulations.

Iminooxadiazine Dione-Forming Reaction

Although the catalyst for deriving a polyisocyanate containing an iminooxadiazine dione group from a diisocyanate is not particularly limited, for example, the catalysts of the following (1) or (2) which are generally known as iminooxadiazine dione-forming reaction catalysts can be used.

(1) (Poly) hydrogen fluoride represented by a general formula $M[F_{n1}]$ or a general formula $M[F_{n1}(HF)_{m1}]$

[wherein, m1 and n1 are each integers that satisfy the relationship of m1/n1>0. M is a cation (mixture) with n1 charge, or one or more radicals having a total valency of n1).]

Specific examples of the (poly) hydrogen fluoride include a tetramethyl ammonium fluoride hydrate and tetraethyl ammonium fluoride and the like.

(2) A compound comprising a compound represented by the following general formula (II-1) or (II-2) and a quaternary ammonium cation or a quaternary phosphonium cation.

[wherein, $R^4$ and $R^6$ are each independently a branched, cyclic or unsaturated perfluoroalkyl group having 1 to 30 carbon atoms. $R^5$ and $R^7$ are each independently at least one selected from the group consisting of a hydrogen atom, a heteroatom, an alkyl group having 1 to 20 carbon atoms, and an aryl group. A plurality of $R^5$ may be the same or different.]

Specific examples of the compound represented by the above general formula (II-1) or (II-2) include 3,3,3-trifluorocarboxylic acid; 4,4,4,3,3-pentafluorobutanoic acid; 5,5,5, 4,4,3,3-heptafluoropentanoic acid; 3,3-difluoroprop-2-enoic acid and the like.

Among the examples, the iminooxadiazine dione-forming reaction catalyst is preferably the catalyst of the above (1) from the viewpoint of ease of availability, and preferably the catalyst of the above (2) from the viewpoint of safety.

The lower limit of the amount of the iminooxadiazine dione-forming reaction catalyst mentioned above is preferably 10 ppm by mass or more, more preferably 20 ppm by mass or more, even more preferably 40 ppm by mass or more, and particularly preferably 80 ppm by mass or more, with respect to the mass of the charged diisocyanate.

On the other hand, the upper limit of the used amount of the iminooxadiazine dione-forming reaction catalyst described above is preferably 1000 ppm by mass or less, more preferably 800 ppm by mass or less, even more preferably 600 ppm by mass, and particularly preferably 500 ppm by mass or less, with respect to the mass of the charged diisocyanate.

That is, the amount of the iminooxadiazine dione-forming reaction catalyst to be used described above is preferably 10 to 1000 ppm by mass, and more preferably 20 to 800 ppm by mass, even more preferably 40 to 600 ppm by mass, and particularly preferably 80 to 500 ppm by mass, with respect to the mass of the charged diisocyanate.

The lower limit of the iminooxadiazine dione-forming reaction temperature is preferably 40° C. or higher, more preferably 50° C. or higher, and even more preferably 55° C. or higher.

On the other hand, the upper limit of the iminooxadiazine dione-forming reaction temperature is preferably 120° C. or lower, more preferably 100° C. or lower, even more preferably 90° C. or lower, and particularly preferably 80° C. or lower.

That is, the iminooxadiazine dione-forming reaction temperature is preferably 40 to 120° C., more preferably 50 to 100° C., even more preferably 55 to 90° C., and particularly preferably 55 to 80° C.

When the iminooxadiazine dione-forming reaction temperature is the above lower limit or more, it is possible to further improve the reaction rate of iminooxadiazine dione-forming reaction. When the iminooxadiazine dione-forming reaction temperature is less than or equal to the above upper limit, coloring of polyisocyanate and the like tend to be suppressed more effectively.

Uretdione-Forming Reaction

The catalyst for deriving a polyisocyanate containing uretdione groups from a diisocyanate is not particularly limited, and the examples thereof include tertiary phosphines, for example, trialkyl phosphines such as a tri-n-butyl phosphine, tri-n-octyl phosphine or the like; tris-(dialkylamino) phosphines such as a tris-(dimethylamino) phosphine or the like; and cycloalkyl phosphines such as a cyclohexyl-di-n-hexylphosphine or the like.

Many of the above-mentioned uretdione-forming reaction catalysts simultaneously promote the isocyanuration reaction, and thus an isocyanurate group-containing polyisocyanate is produced in addition to the uretdione group-containing polyisocyanate.

At the desired conversion rate (mass ratio of the polyisocyanate produced in the uretdione-forming reaction to the mass of the diisocyanate charged), the deactivator of the uretdione-forming reaction catalyst (for example, phosphoric acid, methyl p-toluenesulfonate or the like) is added to stop the uretodination reaction. After termination of the reaction, filtration may be performed if necessary.

Further, the uretdione group can also be obtained by heating the diisocyanate without using the above-described uretdione-forming reaction catalyst.

The uretdione-forming reaction temperature is preferably 120° C. or higher, more preferably 130 to 170° C., and even more preferably 140 to 160° C.

In addition, the uretdione-forming reaction time is preferably 30 minutes to 4 hours, more preferably 1 to 3 hours, and even more preferably 1 to 2 hours.

Allophanatization Reaction

The catalyst for deriving the polyisocyanate containing an allophanate group from a diisocyanate is not particularly limited, and examples thereof include alkyl carboxylates of tin, lead, zinc, bismuth, zirconium, zirconyl or the like; organic tin compounds such as a tin 2-ethylhexanoate, dibutyltin dilaurate; organic lead compounds such as a lead 2-ethylhexanoate; organic zinc compounds such as a zinc 2-ethylhexanoate; bismuth 2-ethylhexanoate; zirconium 2-ethylhexanoate; zirconyl 2-ethylhexanoate and the like. These examples may be used alone or in combination of two or more thereof.

In addition, the above-mentioned isocyanuration reaction catalyst can also be used as an allophanatization catalyst. When the allophanatization reaction is carried out using the above-mentioned isocyanuration reaction catalyst, of course, isocyanurate group-containing polyisocyanate is also produced.

Among the examples, from the viewpoint of economical production, it is preferable to perform the allophanatization reaction and isocyanuration reaction using the above-described isocyanuration reaction catalyst as the allophanatization reaction catalyst.

The lower limit of the used amount of the allophanatization reaction catalyst described above is preferably 10 ppm by mass or more, more preferably 20 ppm by mass or more, even more preferably 40 ppm by mass or more, and still even more preferably 80 ppm by mass or more, with respect to the mass of the charged diisocyanate.

The upper limit of the used amount of the allophanatization reaction catalyst described above is preferably 1000 ppm by mass or less, more preferably 800 ppm by mass or less, even more preferably 600 ppm by mass or less, and particularly preferably 500 ppm by mass or less, with respect to the mass of the charged diisocyanate.

That is, the amount of the allophanatization reaction catalyst described above is preferably 10 ppm by mass to 1000 ppm by mass, more preferably 20 ppm by mass to 800 ppm by mass, even more preferably 40 ppm by mass to 600 ppm by mass, and particularly preferably 80 ppm to 500 ppm by mass.

The lower limit of the allophanatization reaction temperature is preferably 40° C. or higher, more preferably 60° C. or higher, even more preferably 80° C. or higher, and particularly preferably 100° C. or higher.

The upper limit of the allophanatization reaction temperature is preferably 180° C. or lower, more preferably 160° C. or lower, and even more preferably 140° C. or lower.

That is, the allophanatization reaction temperature is preferably 40 to 180° C., more preferably 60 to 160° C., even more preferably 80 to 140° C., and particularly preferably 100 to 140° C.

When the allophanatization reaction temperature is equal to or higher than the lower limit, it is possible to further improve the reaction rate. When the allophanatization reaction temperature is equal to or lower than the upper limit, coloring of polyisocyanate and the like tend to be suppressed more effectively.

The alcohol that can be used to form the allophanate group is preferably an alcohol formed only of carbon, hydrogen and oxygen, and more preferably a di- to trihydric alcohol.

Specific examples of the alcohol that can be used to form the allophanate group include monoalcohols such as a methanol, ethanol, propanol, butanol, pentanol, hexanol, heptanol, octanol, nonanol or the like; diols such as an ethylene glycol, 1,3-propanediol, 1,2-propanediol, 1,3-butanediol, 1,4-butanediol, 2,3-butanediol, 1,5-pentanediol, 1,2-pentanediol, 1,3-pentanediol, 1,4-pentanediol, neopentyl glycol, 1,6-hexanediol, 1,7-heptanediol, 1,8-octanediol, 1,9-nonanediol, 1,10-decanediol, diethylene glycol, polyethylene glycol, polypropylene glycol, polytetramethylene glycol, 2-methyl-1,3-propanediol, 3-methyl-1,5-pentanediol, 2-ethyl hexanediol, 2-methyl-1,8-octanediol, 2,2-diethyl-1,3-propanediol or the like; triols such as a glycerin, trimethylolpropane, derivatives thereof, or the like. The alcohol is not limited to these examples. These alcohols may be used alone or in combination of two or more thereof.

The above-mentioned isocyanuration reaction, iminooxadiazine dione-forming reaction, uretdione-forming reaction, and allophanatization reaction may be performed sequentially, or some of them may be performed in parallel. As the order in which the above reaction proceeds, it is preferable to carry out the isocyanuration reaction in advance and then carry out the uretdione-forming reaction. From the viewpoint of simplifying the production process, it is more preferable to carry out the isocyanuration reaction in advance and then carry out the uretdione-forming reaction by heating.

The polyisocyanate can be obtained by removing the unreacted diisocyanate from the reaction solution by thin film distillation, extraction or the like after completion of the reaction.

To the obtained polyisocyanate, for example, an antioxidant or a UV absorber may be added for the purpose of suppressing coloring during storage.

Examples of the antioxidant include hindered phenols such as a 2,6-di-t-butyl-p-cresol. Examples of the ultraviolet absorber include a benzotriazole, benzophenone and the like. These examples may be used alone or in combination of two or more thereof. It is preferable that the addition amounts thereof be 10 ppm by mass to 500 ppm by mass with respect to the mass of polyisocyanate.

(Physical Properties of Polyisocyanate Component)

The physical properties of the polyisocyanate component contained in the polyaspartic coating composition of the present embodiment will be described in detail below.

Content of Isocyanate

The lower limit of the isocyanate content (hereinafter sometimes referred to as "NCO content") of the polyisocyanate component contained in the polyaspartic coating composition of the present embodiment is preferably 10% by mass or more, more preferably 12% by mass or more, and even more preferably 13% by mass or more, with respect to the total mass (100% by mass) of the polyisocyanate component. On the other hand, the upper limit of the NCO content of the polyisocyanate component is preferably 30% by mass or less, more preferably 25% by mass or less, and even more preferably 22% by mass or less. That is, the NCO content of the polyisocyanate component is preferably 10 to 30% by mass, more preferably 12 to 25% by mass, and even more preferably 13 to 22% by mass. When the NCO content of the polyisocyanate component is equal to or more than the above lower limit, the curability of the resulting coated film tends to be further improved. On the other hand, when the NCO content of the polyisocyanate component is equal to or less than the above upper limit, the viscosity of the polyisocyanate component can be further lowered, and the composition can be applied to high solids formulations and solventless formulations. The NCO content of the polyisocyanate component can be measured by the method described in the Examples described later.

Viscosity

The lower limit of the viscosity at 25° C. of the polyisocyanate component contained in the polyaspartic coating composition of the present embodiment is preferably 1,000 mPa·s or more, more preferably 1,200 mPa·s or more, even more preferably 1,500 mPa·s, and particularly preferably 2,000 mPa·s or more. On the other hand, the upper limit of the viscosity at 25° C. of the polyisocyanate component is preferably 50,000 mPa·s or less, more preferably 40,000 mPa·s or less, even more preferably 30,000 mPa·s or less, and particularly preferably 25,000 mPa·s. That is, the viscosity at 25° C. of the polyisocyanate component is preferably 1,000 to 50,000 mPa·s, more preferably 1,200 to 40,000 mPa·s, even more preferably 1,500 to 30,000 mPa·s, and particularly preferably 2,000 to 25,000 mPa·s. When the viscosity at 25° C. of the polyisocyanate component is equal to or higher than the above lower limit, the curability of the resulting coating film tends to be further improved. On the other hand, when the viscosity at 25° C. of the polyisocyanate component is equal to or lower than the upper limit, the viscosity of the polyisocyanate component can be further lowered, and can be applied to high solids formulations or solventless formulations. The viscosity at 25° C. of the polyisocyanate component can be measured by the method described in the Examples described later.

Number-Average Molecular Weight

The lower limit of the number-average molecular weight of the polyisocyanate component contained in the polyaspartic coating composition of the present embodiment is preferably 700 or more, more preferably 705 or more, even more preferably 710 or more, and particularly preferably 720 or more. On the other hand, the upper limit of the number-average molecular weight of the polyisocyanate component is preferably 3,500 or less, more preferably 3,000 or less, even more preferably 2,500 or less, and particularly preferably 2,000 or less. That is, the number-average molecular weight of the polyisocyanate component is preferably 700 to 3500, more preferably 705 to 3,000, even more preferably 710 to 2,500, and particularly preferably 720 to 2,000. When the number-average molecular weight of the polyisocyanate component is equal to or more than the above lower limit, the curability of the resulting coating film tends to be further improved. On the other hand, when the number-average molecular weight of the polyisocyanate component is equal to or less than the upper limit, the viscosity of the polyisocyanate component can be lowered, and the composition can be applied to high solids formulations and solventless formulations. The number-average molecular weight of the polyisocyanate component can be measured by the method described in the Examples described later.

Average Number of Isocyanate Groups

The lower limit of the average number of isocyanate groups of the polyisocyanate component contained in the polyaspartic coating composition of the present embodiment is preferably 3.5 or more, more preferably 3.6 or more, even more preferably 3.7 or more, and particularly preferably 3.8 or more. On the other hand, the upper limit of the average number of isocyanate groups in of the polyisocyanate component is preferably 10.0 or less, more preferably 9.0 or less, even more preferably 8.0 or less, and particularly preferably 7.0 or less. That is, the average number of isocyanate groups of the polyisocyanate component is preferably 3.5 to 10.0, more preferably 3.6 to 9.0, and even more preferably 3.7 to 8.0, and particularly preferably 3.8 to 7.0. When the average number of isocyanate groups of the polyisocyanate component is equal to or more than the above lower limit, the curability and weatherability of the resulting coating film tend to be further improved. On the other hand, when the average number of isocyanate groups of the polyisocyanate component is equal to or less than the above upper limit, the viscosity of the polyisocyanate component can be lowered, and the composition can be applied to high solids formulations and solventless formulations. The average number of isocyanate groups of the polyisocyanate component can be measured by the method described in the Examples described later.

(Other Components)
((C) Polyvalent Active Hydrogen Compound)

The polyaspartic coating composition of the present invention may further includes, as a resin component, (C) a polyvalent active hydrogen compound in addition to (A) an aspartic acid ester compound, (B) a polyisocyanate component, and (B') a polyisocyanate component.

Although the (C) polyvalent active hydrogen compound is not particularly limited, for example, a polyol, a polyamine or an alkanolamine is preferable, and a polyol is more preferable. These polyvalent active hydrogen compounds may be contained singly or in combination of two or more thereof.

Polyol

Examples of the polyol include a polyester polyol, polyether polyol, acrylic polyol, polyolefin polyol, fluorine polyol, polycarbonate polyol, polyurethane polyol and the like. These polyols may be contained singly or in combination of two or more thereof.

Among the examples, as the polyol, acrylic polyol or polyester polyol is preferable.

Polyester Polyol

The polyester polyol can be obtained, for example, by a condensation reaction of a dibasic acid alone or a mixture of two or more thereof with a polyhydric alcohol alone or a mixture of two or more thereof.

Examples of the dibasic acid include carboxylic acids such as a succinic acid, adipic acid, dimer acid, maleic anhydride, phthalic anhydride, isophthalic acid, terephthalic acid, 1,4-cyclohexanedicarboxylic acid and the like.

Examples of the polyhydric alcohol include an ethylene glycol, propylene glycol, diethylene glycol, 1,4-butanediol, neopentyl glycol, 1,6-hexanediol, trimethylpentanediol, cyclohexanediol, trimethylolpropane, glycerin and pentaerythritol, 2-methylolpropanediol, ethoxylated trimethylolpropane and the like.

Alternatively, for example, polycaprolactones obtained by ring-opening polymerization of lactones such as an ε-caprolactone using a polyhydric alcohol can also be used as the polyester polyol.

Polyether Polyol

The polyether polyol can be obtained, for example, using any of the following methods (1) to (3).

(1) A method of obtaining a polyether polyol by performing random or block addition of an alkylene oxide alone or a mixture thereof to a polyhydroxy compound alone or a mixture thereof using a catalyst.

Examples of the catalyst include hydroxides (lithium, sodium, potassium or the like), strongly basic catalysts (alcoholate, alkylamines or the like), composite metal cyanide complexes (metal porphyrin, zinc hexacyanocobaltate complex or the like), and the like.

Examples of the alkylene oxide include an ethylene oxide, propylene oxide, butylene oxide, cyclohexene oxide, styrene oxide and the like.

(2) A method for obtaining a polyether polyol by reacting an alkylene oxide with a polyamine compound.

Examples of the polyamine compound include ethylene diamines.

As the alkylene oxide, the same as exemplified in the above (1) can be mentioned.

(3) A method of polymerizing an acrylamide or the like using the polyether polyols obtained in (1) or (2) as a medium to obtain so-called polymer polyols.

Examples of the polyvalent hydroxy compound include the following:

(i) diglycerin, ditrimethylolpropane, pentaerythritol, dipentaerythritol and the like;

(ii) sugar alcohol compounds such as an erythritol, D-threitol, L-arabinitol, ribitol, xylitol, sorbitol, mannitol, galactitol, rhamnitol or the like;

(iii) monosaccharides such as an arabinose, ribose, xylose, glucose, mannose, galactose, fructose, sorbose, rhamnose, fucose, ribodese or the like;

(iv) disaccharides such as a trehalose, sucrose, maltose, cellobiose, gentiobiose, lactose, melibiose or the like;

(v) trisaccharides such as a raffinose, gentianose, melitose or the like; and (vi) tetrasaccharides such as a stachyose or the like.

Acryl Polyol

The acrylic polyol can be obtained by copolymerizing one or a mixture of ethylenically unsaturated bond-containing monomers having a hydroxyl group with one or a mixture of other ethylenically unsaturated bond-containing monomers copolymerizable therewith.

The ethylenically unsaturated bond-containing monomer having a hydroxyl group is not particularly limited, and examples thereof include a hydroxyethyl acrylate, hydroxypropyl acrylate, hydroxybutyl acrylate, hydroxyethyl methacrylate, hydroxypropyl methacrylate, hydroxybutyl methacrylate and the like. Among the examples, a hydroxyethyl acrylate or hydroxyethyl methacrylate is preferable.

Examples of other ethylenically unsaturated bond-containing monomers copolymerizable with the above-mentioned monomers include those shown in the following (i) to (iv). These examples may be used alone or in combination of two or more thereof.

(i) Methyl acrylate, acrylic esters such as an ethyl acrylate, propyl acrylate, isopropyl acrylate, acrylic acid-n-butyl, isobutyl acrylate, acrylic acid-n-hexyl, acrylic acid cyclohexyl, 2-ethylhexyl acrylate, lauryl acrylate, benzyl acrylate, phenyl acrylate or the like.

(ii) Methyl methacrylate, methacrylic acid esters such as an ethyl methacrylate, propyl methacrylate, isopropyl methacrylate, methacrylic acid-n-butyl, isobutyl methacrylate, methacrylic acid-n-hexyl, cyclohexyl methacrylate, 2-ethylhexyl methacrylate, lauryl methacrylate, benzyl methacrylate, phenyl methacrylate or the like; unsaturated carboxylic acids such as an acrylic acid, methacrylic acid, maleic acid, itaconic acid or the like.

(iii) Unsaturated amides such as an acrylamide, methacrylamide, N, N-methylenebisacrylamide, diacetone acrylamide, diacetone methacryl amide, maleic acid amide, maleimide or the like.

(iv) Vinyl monomers such as a glycidyl methacrylate, styrene, vinyl toluene, vinyl acetate, acrylonitrile, dibutyl fumarate or the like; vinyl monomers having a hydrolyzable silyl group such as a vinyltrimethoxysilane, vinylmethyldimethoxysilane, y-(meth)acryloxypropyltrimethoxysilane or the like.

Polyolefin Polyol

The polyolefin polyol is not particularly limited, and examples thereof include a polybutadiene having two or more hydroxyl groups, hydrogenated polybutadiene, polyisoprene, hydrogenated polyisoprene and the like.

It is preferable that the number of hydroxyl groups possessed by one statistical molecule of polyol (hereinafter, sometimes referred to as "average number of hydroxyl groups") be two or more. When the average number of hydroxyl groups of the polyol is two or more, a decrease in the crosslink density of the coating film obtained by curing the polyaspartic coating composition of the present embodiment tends to be suppressed.

Fluorine Polyol

In the present description, the term "fluorine polyol" refers to a polyol containing fluorine in the molecule. Specific examples of the fluorine polyol include copolymers, such as a fluoroolefin, cyclovinyl ether, hydroxyalkyl vinyl ether and monocarboxylic acid vinyl ester and the like disclosed in JP-A-S57-34107 (Reference 1) and JP-A-S61-275311 (Reference 2).

Polycarbonate Polyol

Although the polycarbonate polyols are not particularly limited, examples thereof include dialkyl carbonates such as a dimethyl carbonate or the like; alkylene carbonates such as an ethylene carbonate or the like; low-molecular-weight carbonate compounds such as diaryl carbonates such as a diphenyl carbonate or the like; those obtained by condensation polymerization of the low-molecular-weight polyols used for the above-mentioned polyester polyols, and the like.

Polyurethane Polyol

Although it is not particularly limited, the polyurethane polyol, for example, can be obtained by reacting a polyol which does not contain a carboxyl group with an isocyanate component by a conventional method.

Examples of the polyol which does not contain a carboxyl group include an ethylene glycol and a propylene glycol as low-molecular-weight ones, and examples of high-molecular-weight ones include an acrylic polyol, polyester polyol and polyether polyol.

Hydroxyl Value of Polyol

Although the hydroxyl value of the polyol per resin is not particularly limited, it is preferably 10 to 300 mgKOH/resin (g).

When the hydroxyl value per resin is equal to or more than the above lower limit, a decrease of crosslinking density tends to be suppressed, and the desired physical properties can be achieved more sufficiently. When the hydroxyl value per resin is equal to or less than the above upper limit, the crosslink density is prevented from excessively increasing, and the mechanical strength of the coating film obtained by curing the polyaspartic coating composition of the present embodiment can be further enhanced.

In addition, the hydroxyl value of the polyol can be measured according to JIS K1557.

Polyamine

Although the polyamine is not particularly limited, a polyamine having two or more primary amine groups or secondary amine groups in one molecule is preferable, and a polyamine having three or more primary amine groups or secondary amine groups in one molecule is more preferable.

Specific examples of the polyamine include diamines such as an ethylenediamine, propylenediamine, butylenediamine, triethylenediamine, hexamethylenediamine, 4,4'-diaminodicyclohexylmethane, piperazine, 2-methylpiperazine, isophorone diamine or the like; chain polyamines having three or more amino groups such as a bishexamethylenetriamine, diethylenetriamine, triethylenetetramine, tetraethylenepentamine, pentamethylenehexamine, tetrapropylenepentamine or the like; cyclic polyamines such as a 1,4,7,10,13,16-hexaazacyclooctadecane, 1,4,7,10-tetraazacyclodecane, 1,4,8,12-tetraazacyclopentadecane, 1,4,8,11-tetraazacyclotetradecane or the like; and the like.

Alkanolamine

In the present description, the term "alkanolamine" refers to a compound having an amino group and a hydroxyl group in one molecule.

Specific examples of the alkanolamine include a monoethanolamine, diethanolamine, aminoethylethanolamine, N-(2-hydroxypropyl) ethylenediamine, mono- or di-(n- or iso-) propanolamine, ethylene glycol-bis-propylamine, neopentanolamine, methylethanolamine and the like.

((D) Other Resin Components)

In addition to (A) an aspartic acid ester, (B) a polyisocyanate component, (B') a polyisocyanate component, and (C) a polyvalent active hydrogen compound, the polyaspartic coating composition of the present invention may further contain (D) other resin components such as an existing melamine resin, epoxy resin, polyurethane resin and the like according to need.

((E) Other Additives)

Moreover, when the polyaspartic coating composition of the invention contains a polyol which has a carboxyl group, the composition may further contain (E) other additives such as an oxazoline group-containing compound and a carbodiimide group-containing compound or the like. These compounds may be contained singly or in combination of two or more thereof.

Moreover, when the polyaspartic coating composition of the invention contains a polyol which has a carbonyl group, the composition may further contain (E) other additives such as a hydrazide group-containing compound and a semicarbazide group-containing compound or the like. These compounds may be contained singly or in combination of two or more thereof.

In addition, the polyaspartic coating composition of the present invention, if necessary, may further contain (E) other additives, for example, antioxidants such as a hindered phenol or the like, UV absorbers such as a benzotriazole, benzophenone or the like; pigments such as a titanium oxide, carbon black, indigo, quinacridone, pearl mica or the like; metallic powder pigments such as an aluminum or the like; rheology control agents such as a hydroxyethyl cellulose, urea compound, microgel or the like; curing accelerators such as a tin compound, zinc compound, amine compound or the like in addition to (A) an aspartic ester compound, (B) a polyisocyanate component, (B') a polyisocyanate component and (C) a polyvalent active hydrogen compound.

<<Method for Producing Polyaspartic Coating Composition>>

The polyaspartic coating composition of the present invention can be obtained by using and mixing (A) an aspartic acid ester described above, (B) a polyisocyanate component or (B') a polyisocyanate component containing the above-described polyisocyanate, optionally, (C) a polyvalent active hydrogen compound, (D) other resin components, and (E) other additives using a known method.

(Physical Properties)

[Molar Ratio Between Amino Group and Isocyanate Group]

In the polyaspartic coating composition of the present invention, the molar ratio between the amino group of (A) the aspartic acid ester compound and the isocyanate group of (B) the polyisocyanate component or (B') the polyisocyanate component (amino group/isocyanate group) is preferably 1/10 to 10/1, more preferably 1/5 to 5/1, and even more preferably 1/2 to 2/1. When the molar ratio of the isocyanate group to the amino group (amino group/isocyanate group) is equal to or more than the above lower limit, the weather resistance of the coating film obtained by curing the polyaspartic coating composition of the present embodiment can be further improved. On the other hand, when the molar ratio of the isocyanate group to the amino group (amino group/isocyanate group) is equal to or less than the upper limit, the curability of the coating film obtained from the polyaspartic coating composition of the present embodiment can be improved.

In addition, the molar ratio between the amino group and the isocyanate group can be calculated from the amine value of (A) the aspartic acid ester compound and the isocyanate content of (B) the polyisocyanate component or (B') polyisocyanate component.

[Molar Ratio Between Isocyanate Group and Hydroxyl Group]

When the polyaspartic coating composition of the present invention contains a polyol, the molar ratio between the isocyanate group and hydroxyl group (isocyanate group/hydroxyl group) is preferably 1/10 to 10/1.

(Use)

The polyaspartic coating composition of the present invention can be suitably used as a primer or an intermediate or upper coating material for metals such as steel plates or surface-treated steel plates, plastics, ceramics such as inorganic materials, glass and concrete by roll coating, curtain flow coating, spray coating, electrostatic coating, bell coating, immersion, roller coating, brush coating or the like.

The polyaspartic coating composition of the present invention can be suitably used to impart aesthetics, weather resistance, acid resistance, rust resistance, chipping resistance, adhesion and the like.

In addition, the polyaspartic coating composition of the present invention is also useful as an adhesive, a pressure-sensitive adhesive, an elastomer, a foam, a surface treatment agent and the like.

In addition, in the polyaspartic coating composition of the present invention, since the coating film is softened or the crosslink density of the coating film is increased, the weather resistance is particularly excellent. Therefore, it can be suitably used for the heavy-duty anticorrosion coating of structures that require long-term weather resistance, such as bridges, highways, power transmission towers, and wind power generation blades that are exposed to severe environments such as wind, rain, snow and cold.

<Coating Film>

The coating film of one embodiment of the present invention is a coating film formed by the above-mentioned polyaspartic coating composition.

The coating film of the present embodiment can be obtained by coating the above-described polyaspartic coating composition using a known method such as roll coating, curtain flow coating, spray coating, bell coating, electrostatic coating or the like, and then drying at room temperature or baking to cure.

The coating film of the present embodiment has excellent drying property, curing property, scratch resistance, chemical resistance and weather resistance.

<Coated Article>

The coated article of one embodiment of the present invention is provided with the above-mentioned coating film.

The coated article of the present embodiment is provided with the above-mentioned coating film which has excellent drying property, curing property, scratch resistance, chemical resistance and weather resistance, and imparted with aesthetics, acid resistance, rust resistance, chipping resistance, adhesion and the like.

<Corrosion Prevention Method of Structure>

The method of corrosion prevention of a structure according to one embodiment of the present invention includes coating the structure with the above-described polyaspartic coating composition.

As the coating method, known methods such as roll coating, curtain flow coating, spray coating, bell coating, electrostatic coating and the like can be used. After the polyaspartic coating composition is applied to a structure, it is subjected to a room-temperature drying or baking process and cured to form a coating film on the structure. The structure is not particularly limited as long as it is a structure requiring long-term weather resistance, and examples thereof include bridges, expressways, transmission towers, and wind power generation blades.

EXAMPLES

Hereinafter, the present embodiment will be described in more detail by using the Examples. However, the present embodiment is not limited to the Examples. The measurement of the various physical properties and various evaluation methods are demonstrated below. In addition, "part" and "%" refer to "part by mass" and "% by mass", unless otherwise specified.

(Physical Property 1) NCO Content (% by Mass)

The NCO content (isocyanate content, % by mass) of a polyisocyanate was measured as follows. First, 1 to 3 g (Wg) of a polyisocyanate prepared in a Production Example was precisely weighed into an Erlenmeyer flask, 20 mL of toluene was added, and the polyisocyanate was completely dissolved. Thereafter, 10 mL of a solution of 2N di-n-butylamine in toluene was added and completely mixed, and then the mixture was allowed to stand for 15 minutes at room temperature. Moreover, 70 mL of isopropyl alcohol was added to this solution and completely mixed. This solution was then titrated with 1N hydrochloric acid solution (factor F) using an indicator, and thus a titration value $V_2$ mL was obtained. The same titration operation was performed without polyisocyanate, and a titration value $V_1$ mL was obtained. The NCO content of the polyisocyanate was calculated from the resulting titration value $V_2$ mL and the titration value $V_1$ mL based on the following equation:

NCO content=$(V_1-V_2)$×F×42/(W×1000)×100

(Physical Property 2) Viscosity (mPa·s)

The viscosity of the polyisocyanate was measured at 25° C. using an E-type viscometer (trade name: RE-85R, manufactured by Toki Sangyo Co., Ltd.). In the measurement, a standard rotor (1°34'×$R24$) was used. The rotation speed was set as follows.

100 r.p.m. (in the case of less than 128 mPa·s)

50 r.p.m. (in the case of 128 mPa·s or more and less than 256 mPa·s)

20 r.p.m. (in the case of 256 mPa·s or more and less than 640 mPa·s)

10 r.p.m. (in the case of 640 mPa·s or more and less than 1,280 mPa·s)

5 r.p.m. (in the case of 1,280 mPa·s or more and less than 2,560 mPa·s)

2.5 r.p.m. (in the case of 2,560mPa·s or more and less than 5,184 mPa·s)

1.0 r.p.m. (in the case of 5,184 mPa·s or more and less than 12,960 mPa·s)

0.5 r.p.m. (in the case of 12,960 mPa·s or more and less than 25,920 mPa·s)

(Physical Property 3) Number-Average Molecular Weight

The number-average molecular weight of the polyisocyanate was determined as a number-average molecular weight in terms of polystyrene by gel permeation chromatography (hereinafter abbreviated as "GPC") using the following device.

Device: "HLC-8120GPC" (trade name) manufactured by Tosoh Corporation

Column: "TSKgel Super H1000" (trade name)×1,
"TSKgel Super H2000" (product name)×1,
"TSKgel Super H 3000" (product name)×1, manufactured by Tosoh Corporation Carrier: Tetrahydrofuran Detection method: Differential refractometer (Physical Property 4) Average Number of Isocyanate Groups The average number of isocyanate groups of the polyisocyanate was calculated from the NCO content (physical property 1) and the number-average molecular weight (physical property 3) based on the following equation.

Average number of isocyanate groups=number-average molecular weight×NCO content/100/42

(Physical Property 5) Mass Concentration of Diisocyanate Monomer (% by Mass)

The diisocyanate mass concentration of the polyisocyanate was determined as follows. First, a 20 mL sample bottle was placed on a digital balance scale, and approximately 1 g of the sample was precisely weighed. Next, 0.03 to 0.04 g of nitrobenzene (internal standard solution) was added and precisely weighed. Finally, after adding about 9 mL of ethyl acetate, the lid was tightly closed and the sample was mixed well. The prepared sample was analyzed and quantified by gas chromatography under the following conditions.

Device: "GC-8A" manufactured by SHIMADZU Corporation

Column: "Silicone OV-17" manufactured by Shinwa Chemical Industries Ltd.

Column oven temperature: 120° C.

Injection/detector temperature: 160° C.

(Physical Property 6) Polycaprolactone Polyol Ratio

The ratio of the polycaprolactone polyol to the total amount of polyol was calculated from the charged amounts of the polycaprolactone polyol and the entire polyol based on the following equation.

Polycaprolactone polyol ratio=charged amount of polycaprolactone polyol/total amount of charged polyol x 100

(Physical Property 7) Polyoxyalkylene Polyol Ratio

The polyoxyalkylene polyol ratio was calculated from the charged amounts of the polycaprolactone polyol and the polyoxyalkylene polyol based on the following equation.

Polyoxyalkylene polyol ratio=charged amount of polyoxyalkylene polyol/(charged amount of polycaprolactone polyol+charged amount of polyoxyalkylene polyol)×100

(Physical Property 8) Content of Isocyanurate Trimer

The content of the isocyanurate trimer was quantified by GPC measurement shown in the number-average molecular weight (physical property 3). The peak area % corresponding to a molecular weight three times that of the diisocyanate used as a raw material was taken as the content of the isocyanurate trimer.

(Evaluation 1) Drying Property

"Desmophen 1420" (aspartic acid ester compound, trade name, manufactured by Covestro, amine value: 201 mg KOH/resin (g)) and "Desmophen 1520" (aspartic acid ester compound, trade name, manufactured by Covestro, amine value: 191 mg KOH/resin (g)) were pre-blended at a weight ratio of 1/1. The blended aspartic acid ester compounds and a polyisocyanate component were then blended so that NCO/NH=1.1, and adjusted with n-butyl acetate so that the solid content of the coating composition =80% by mass to obtain a polyaspartic coating composition. The obtained polyaspartic coating composition was coated to a glass plate with an applicator so that the dried film thickness was 80 to 100 μm, followed by drying at 23° C. The tack-free time was investigated and the drying property was evaluated according to the following criteria.

◎: less than 90 minutes
○: 90 minutes or more and less than 120 minutes
Δ: 120 minutes or more and less than 180 minutes
×: 180 minutes or more (Evaluation 2) Scratch Resistance A commercially available solvent type two-pack acrylic urethane white enamel paint was spray-coated on an aluminum plate in advance and baked for 2 hours at 80° C., and then aged at room temperature for 2 weeks or more. Thereafter, a white plate whose surface was polished with #1000 sandpaper until the gloss value at 60° reached 10% or less was prepared as a base material. A polyaspartic coating composition obtained in the same manner as in (Evaluation 1) was coated on the white plate with an applicator so that the dried film thickness was 80 to 100 μm and dried at 23° C. for 7 days, thereby obtaining a cured coating film. The scratch resistance test was performed on the obtained coating film using a rubbing tester (manufactured by Taisei Rika Kogyo Co. LTD) by the following method.

The 20° gloss value of the coated surface was measured in advance. About 1 g of polishing agent prepared by mixing a cleanser (trade name: Marzen Cleanser, manufactured by Maruzen Cleanser, Inc.) and water at a ratio of 3:2 was applied to the rubbing tester sponge, and the coating film of the test plate was rubbed back and forth 20 times under a load of 200 g. The coated surface was washed with running water, and after natural drying, the 20° gloss value of the coated surface was measured. The retention rate of the 20° gloss value was calculated based on the following equation, and the scratch resistance was evaluated according to the following criteria.

Retention rate of 20° gloss value=(20° gloss value after test/20° gloss value before test)×100

If the retention rate of the 20° gloss value is 90% or more, it was evaluated as "◎", if less than 90% to 80% or more, it was evaluated as "○", if less than 80% to 50% or more, it was evaluated as "Δ", and if less than 50%, it was evaluated as "×".

◎: 90% or more of gloss retention rate
○: 80% or more and less than 90% of gloss retention rate
Δ: 50% or more and less than 80% of gloss retention rate
×: less than 50% of gloss retention rate (Evaluation 3) Weather Resistance A polyaspartic coating composition obtained in the same manner as in (Evaluation 1) was coated on a white plate with an applicator so that the dried film thickness was 80 to 100 μm and dried at 23° C. for 7 days, thereby obtaining a cured coating film. Thereafter, evaluation was performed under the conditions of JIS K5600-7-8 using Dewpanel light control weather meter FDP manufactured by Suga Test Instruments Co., Ltd.

◎: 90% or more of gloss retention rate at 60° after exposure for 3000 hours
○: 90% or more of gloss retention rate at 60° after exposure for 2000 hours
Δ: 80% or more and less than 90% of gloss retention rate at 60° after exposure for 1800 hours ×: less than 80% of gloss retention rate at 60° after exposure for 1600 hours
(Evaluation 4) Curability A polyaspartic coating composition obtained in the same manner as in (Evaluation 2) was coated on a glass plate with an applicator so that the dried film thickness was 80 to 100 μm, and then dried at 23° C. for 6 hours, thereby obtaining a cured coating film.

The obtained cured coating film was peeled off from the PP plate and immersed in acetone at 23° C. for 24 hours, and then the mass value of the undissolved portion relative to the mass before immersion (gel fraction) was calculated. Thereafter, the curability was evaluated according to the evaluation criteria shown below.
(Evaluation criteria)
⊚: 80% or more of gel fraction
○: 70% or more and less than 80% of gel fraction
Δ: 60% or more and less than 70% of gel fraction
×: less than 60% of gel fraction (Evaluation 5) Chemical Resistance A polyaspartic coating composition obtained in the same manner as in (Evaluation 2) was coated on a glass plate with an applicator so that the dried film thickness was 80 to 100 μm, followed by drying at 23° C. for 7 days to obtain a cured coating film.

Subsequently, "Skydrol 500B-4" (phosphate ester-based flame retardant hydraulic fluid for aircraft, trade name, manufactured by EASTMAN) was dropped on the obtained cured coating film, and allowed to stand at 23° C. for 24 hours. Subsequently, the appearance change of the coating film after 24 hours was observed. Subsequently, chemical resistance was evaluated according to the evaluation criteria shown below.
(Evaluation Criteria)
○: No change in appearance of coating film
Δ: slight change in appearance of coating film
×: change in appearance of coating film Production Example 1-1

The inside of a four-necked flask equipped with a stirrer, thermometer, reflux condenser, nitrogen blow-in pipe and dropping funnel was made into a nitrogen atmosphere, and 100 parts of HDI was charged thereto, and the temperature inside the reactor was kept at 60° C. while stirring. 0.15 parts of a solution prepared by diluting an isocyanuration reaction catalyst of tetrabutylammonium acetate with 2-ethyl-1-hexanol to 10% by mass was added to carry out an isocyanuration reaction, and phosphoric acid was added at the time when the NCO content of the reaction solution reached 43.8% by mass to stop the reaction. Thereafter, the reaction solution was kept at 90° C. for 1 hour. The cooled reaction solution was filtered and then the unreacted HDI was removed using a thin film evaporator. A polyisocyanate P1-1 having an NCO content of 23.1% by mass, a viscosity at 25° C. of 1,350 mPa·s, a number-average molecular weight of 590, an isocyanate group average number of 3.2, an HDI monomer mass concentration of 0.1% by mass, and an isocyanurate trimer content of 65.2% by mass was obtained.

Production Example 1-2

The inside of a four-necked flask equipped with a stirrer, thermometer, reflux condenser, nitrogen blow-in pipe and dropping funnel was made into a nitrogen atmosphere, and 100 parts of HDI and 33.7 parts of polycaprolactone triol having a number-average molecular weight of 850 were charged thereto, and the temperature inside the reactor was kept at 95° C. for 90 minutes while stirring to carry out the urethanization reaction. The cooled reaction solution was filtered and then the unreacted HDI was removed using a thin film evaporator. A polyisocyanate P1-2 having an NCO content of 9.0% by mass, a viscosity at 25° C. of 4,980 mPa·s, a number-average molecular weight of 1,520, an isocyanate group average number of 3.3, an HDI monomer mass concentration of 0.2% by mass, and an isocyanurate trimer content of 0.0% by mass was obtained.

Production Example 1-3

The inside of a four-necked flask equipped with a stirrer, thermometer, reflux condenser, nitrogen blow-in pipe and dropping funnel was made into a nitrogen atmosphere, and 100 parts of HDI, 6.9 parts of polycaprolactone triol having a number-average molecular weight of 550 and 12.8 parts of polytetramethylene glycol having a number-average molecular weight of 1,000 were charged thereto, and the temperature inside the reactor was kept at 90° C. for 1 hour while stirring to carry out the urethanization reaction. The cooled reaction solution was filtered and then the unreacted HDI was removed using a thin film evaporator. A polyisocyanate P1-3 having an NCO content of 8.9% by mass, a viscosity at 25° C. of 2,740 mPa·s, a number-average molecular weight of 1,570, an isocyanate group average number of 3.3, an HDI monomer mass concentration of 0.2% by mass, and an isocyanurate trimer content of 0.0% by mass was obtained.

Production Example 1-4

The inside of a four-necked flask equipped with a stirrer, thermometer, reflux condenser and nitrogen blow-in pipe was made into a nitrogen atmosphere, and 100 parts of the polyisocyanate P1-1 and 8 parts of polycaprolactone diol having a number-average molecular weight of 500 were charged thereto, and the temperature inside the reactor was kept at 80° C. for 1 hour while stirring to carry out the urethanization reaction. A polyisocyanate P1-4 having an NCO content of 10.9% by mass, a viscosity at 25° C. of 4,610 mPa·s, a number-average molecular weight of 1,330, an isocyanate group average number of 3.5, an HDI monomer mass concentration of 0.2% by mass, and an isocyanurate trimer content of 11.7% by mass was obtained.

Production Example 1-5

The inside of a four-necked flask equipped with a stirrer, thermometer, reflux condenser, nitrogen blow-in pipe and dropping funnel was made into a nitrogen atmosphere, and 100 parts of HDI and 78.5 parts of polypropylene glycol having a number-average molecular weight of 2,000 were charged thereto, and the temperature inside the reactor was kept at 100° C. for 1 hour while stirring to carry out a urethanization reaction. 0.025 parts of a solution prepared by diluting an allophanatization catalyst of 2-zirconium ethylhexanoate with 2-ethyl-1-hexanol to 20% by mass was added thereto to carry out an isocyanuration reaction, and phosphoric acid was added at the time when the refractive index of the reaction solution increased to 0.0052 to stop the reaction. Thereafter, the reaction solution was kept at 130° C. for 1 hour. The cooled reaction solution was filtered and then the unreacted HDI was removed using a thin film evaporator. A polyisocyanate P1-5 having an NCO content of 6.0% by mass, a viscosity at 25° C. of 2,150 mPa·s, a number-average molecular weight of 2,870, an isocyanate group average number of 4.1, a reacted HDI mass concentration of 0.1% by mass, and an isocyanurate trimer content of 3.0% by mass was obtained.

TABLE 1

| Polyisocyanate | Production Example 1-1 P1-1 | Production Example 1-2 P1-2 | Production Example 1-3 P1-3 | Production Example 1-4 P1-4 | Production Example 1-5 P1-5 |
|---|---|---|---|---|---|
| (Physical Property 1) NCO Content [% by mass] | 23.1 | 9.0 | 8.9 | 10.9 | 6.0 |
| (Physical Property 2) Viscosity [mPa · s/25° C.] | 1,350 | 4,980 | 2,740 | 4,610 | 2,150 |
| (Physical Property 3) Number-Average Molecular Weight | 590 | 1,520 | 1,570 | 1,330 | 2,870 |
| (Physical Property 4) Average Number of Isocyanate Groups | 3.2 | 3.3 | 3.3 | 3.5 | 4.1 |
| (Physical Property 5) Diisocyanate Monomer Mass Concentration [% by mass] | 0.1 | 0.2 | 0.2 | 0.2 | 0.1 |
| (Physical Property 6) Polycaprolactone Polyol Ratio [% by mass] | — | 100.0 | 35.0 | 100.0 | 0.0 |
| (Physical Property 7) Polyoxyalkylene Polyol Ratio [% by mass] | — | 0.0 | 65.0 | 0.0 | 100.0 |
| (Physical Property 8) Isocyanurate Trimer Mass Concentration [% by mass] | 65.2 | 0.0 | 0.0 | 11.7 | 3.0 |

Example 1-1

The inside of a four-necked flask equipped with a stirrer, thermometer, reflux condenser, and nitrogen blow-in tube was made into a nitrogen atmosphere, 18 parts of the polyisocyanate P1-1 and 132 parts of the polyisocyanate P1-2 were charged thereto and stirred until it became uniform to obtain a polyisocyanate component. The results of the physical properties of the obtained polyisocyanate component are shown in Table 2. The drying property and chemical resistance of the aspartic acid ester compound were also evaluated. The results are shown in Table 2.

Examples 1-2 to 1-9, Comparative Examples 1-1 to 1-4

A polyisocyanate component was obtained in the same manner as in Example 1-1 except that the compositions were as shown in Table 2. The results of the physical properties of the obtained polyisocyanate are shown in Table 2. The dryness and chemical resistance of the aspartic acid esters were also evaluated. The results are shown in Table 2.

TABLE 2

| | | Ex. 1-1 | Ex. 1-2 | Ex. 1-3 | Ex. 1-4 | Ex. 1-5 | Ex. 1-6 | Ex. 1-7 | Ex. 1-8 | Ex. 1-9 | Comp. Ex. 1-1 | Comp. Ex. 1-2 | Comp. Ex. 1-3 | Comp. Ex. 1-4 |
|---|---|---|---|---|---|---|---|---|---|---|---|---|---|---|
| (A) Aspartic Acid Ester Compound | Desmophen NH1420 [mass by part] | 50 | 50 | 50 | 50 | 50 | 50 | 50 | 50 | 50 | 50 | 50 | 50 | 50 |
| | Desmophen NH1520 [mass by part] | 50 | 50 | 50 | 50 | 50 | 50 | 50 | 50 | 50 | 50 | 50 | 50 | 50 |
| (B) Polyisocyanate Component | P-1 [mass by part] | 18 | 13 | 7 | — | 22 | 16 | 8 | — | — | 23 | 28 | — | — |
| | P-2 [mass by part] | 132 | 147 | 161 | 180 | — | — | — | — | 90 | 121 | — | — | — |
| | P-3 [mass by part] | — | — | — | — | 124 | 140 | 160 | 180 | 90 | — | 111 | — | — |
| | P-4 [mass by part] | — | — | — | — | — | — | — | — | — | — | — | 148 | — |
| | P-5 [mass by part] | — | — | — | — | — | — | — | — | — | — | — | — | 268 |
| (Physical Property 1) NCO Content [% by mass] | | 10.7 | 10.1 | 9.6 | 9.0 | 11.0 | 10.4 | 9.6 | 8.9 | 9.0 | 11.3 | 11.8 | 10.9 | 6.0 |
| (Physical Property 2) Viscosity [mPa · s/25° C.] | | 4,260 | 4,490 | 4,730 | 4,980 | 2,470 | 2,560 | 2,650 | 2,740 | 3,690 | 4,050 | 2,380 | 4,610 | 2,150 |
| (Physical Property 3) Number-average Molecular Weight | | 1,310 | 1,380 | 1,450 | 1,520 | 1,260 | 1,350 | 1,460 | 1,570 | 1,550 | 1,240 | 1,170 | 1,330 | 2,870 |
| (Physical Property 4) Average Number of Isocyanate Groups | | 3.3 | 3.3 | 3.3 | 3.3 | 3.3 | 3.3 | 3.3 | 3.3 | 3.3 | 3.3 | 3.3 | 3.5 | 4.1 |
| (Physical Property 5) Diisocyanate Monomer Mass Concentration [% by mass] | | 0.2 | 0.2 | 0.2 | 0.2 | 0.2 | 0.2 | 0.2 | 0.2 | 0.2 | 0.2 | 0.2 | 0.2 | 0.1 |

TABLE 2-continued

|  |  | Ex. 1-1 | Ex. 1-2 | Ex. 1-3 | Ex. 1-4 | Ex. 1-5 | Ex. 1-6 | Ex. 1-7 | Ex. 1-8 | Ex. 1-9 | Comp. Ex. 1-1 | Comp. Ex. 1-2 | Comp. Ex. 1-3 | Comp. Ex. 1-4 |
|---|---|---|---|---|---|---|---|---|---|---|---|---|---|---|
| (Physical Property 7) Polyoxyalkylene Polyol Ratio [% by mass] | | 0.0 | 0.0 | 0.0 | 0.0 | 65.0 | 65.0 | 65.0 | 65.0 | 24.0 | 0.0 | 65.0 | 0.0 | 100.0 |
| (Physical Property 8) Isocyanurate Trimer Mass Concentration [% by mass] | | 7.8 | 5.3 | 2.7 | 0.0 | 9.8 | 6.7 | 3.1 | 0.0 | 0.0 | 10.4 | 13.1 | 11.7 | 3.0 |
| Compounding Ratio | Molar Ratio of NCO/NH | 1.1 | 1.1 | 1.1 | 1.1 | 1.1 | 1.1 | 1.1 | 1.1 | 1.1 | 1.1 | 1.1 | 1.1 | 1.1 |
| Solvent | n-Butyl Acetate [mass by part] | 62 | 65 | 67 | 70 | 61 | 64 | 67 | 70 | 70 | 61 | 60 | 62 | 92 |
| (Evaluation 1) Drying Property | | ◎ | ○ | ○ | Δ | ◎ | ○ | ○ | Δ | Δ | ◎ | ◎ | ◎ | X |
| (Evaluation 2) Scratch Property | | ○ | ○ | ○ | ◎ | Δ | ○ | ○ | ◎ | ◎ | X | X | X | ◎ |
| (Evaluation 3) Weather Resistance | | Δ | ○ | ○ | ◎ | Δ | ○ | ○ | ○ | ◎ | Δ | Δ | Δ | X |

As shown in the above results, it was possible to obtain a coating film having excellent scratch resistance and excellent weather resistance while maintaining the drying property by using the polyaspartic coating compositions containing an aliphatic polyisocyanate component of the Examples.

Production Example 2-1

Production of P2-1

The inside of a four-necked flask equipped with a stirrer, a thermometer, a reflux condenser, a nitrogen blowing pipe and a dropping funnel was made into a nitrogen atmosphere, and 100 parts of HDI and 5.0 parts of polycaprolactone triol having a number-average molecular weight of 300 were charged thereto. Then, the temperature inside the reactor was kept at 90° C. for 1 hour while stirring to carry out a urethanization reaction. Next, the temperature inside the reactor was lowered and kept at 80° C., and an isocyanuration reaction catalyst of tetramethylammonium capriate was added to carry out an isocyanuration reaction. Then, phosphoric acid was added at the time when the refractive index of the reaction solution increased to 0.0172 to stop the reaction. Then, the temperature inside the reactor was raised and kept at 90° C. for 1 hour. Then, the reaction solution was cooled and filtered, and then the unreacted HDI was removed using a thin film evaporator to obtain a polyisocyanate P2-1. The obtained P2-1 had an NCO content of 18.2% by mass, a viscosity at 25° C. of 21,310 mPa·s, a number-average molecular weight of 1,240, an isocyanate group average number of 5.4, and an HDI monomer mass concentration of 0.1% by mass. The above physical properties are also shown in Table 3.

Production Example 2-2

Production of P2-2

The inside of a four-necked flask equipped with a stirrer, a thermometer, a reflux condenser, a nitrogen blowing pipe and a dropping funnel was made into a nitrogen atmosphere, and 100 parts of HDI and 4.0 parts of 1,3-butanediol were charged thereto. Then, the temperature inside the reactor was kept at 90° C. for 1 hour while stirring to carry out a urethanization reaction. Next, the temperature inside the reactor was lowered and kept at 80° C., and an isocyanuration reaction catalyst of tetramethylammonium capriate was added to carry out an isocyanuration reaction. Then, phosphoric acid was added at the time when the yield reached 55% to stop the reaction. Then, the temperature inside the reactor was raised and kept at 90° C. for 1 hour. Then, the reaction solution was cooled and filtered, and the unreacted HDI was removed using a thin film evaporator to obtain a polyisocyanate P2-2. The obtained P2-2 had an NCO content of 19.1% by mass, a viscosity at 25° C. of 13,760 mPa·s, a number-average molecular weight of 1,040, an isocyanate group average number of 4.7, and an HDI monomer mass concentration of 0.1% by mass. The above physical properties are shown in Table 3.

Production Example 2-3

Production of P2-3

The inside of a four-necked flask equipped with a stirrer, a thermometer, a reflux condenser, a nitrogen blowing pipe and a dropping funnel was made into a nitrogen atmosphere, and 100 parts of HDI and 6.3 parts of polycaprolactone triol having a number-average molecular weight of 300 were charged thereto. Next, the temperature inside the reactor was kept at 130° C. for 1 hour while stirring to carry out a urethanization reaction. Then, the temperature inside the reactor was kept at 130° C. for 1 hour while stirring to carry out a urethanization reaction. Next, 0.037 parts of a solution prepared by diluting an allophanate reaction catalyst of 2-ethylhexanoate zirconium with 2-ethyl-1-hexanol to 20% by mass was added to carry out an allophanatization reaction. Then, phosphoric acid was added at the time when the refractive index of the reaction solution increased to 0.0052 to stop the reaction. Then, the temperature inside the reactor was kept at 90° C. for 1 hour. Then, the reaction solution was cooled and filtered, and then the unreacted HDI was removed using a thin film evaporator to obtain a polyisocyanate P2-3. The obtained P2-3 had an NCO content of 17.7% by mass, a viscosity at 25° C. of 9,250 mPa·s, a number-average molecular weight of 1,450, an isocyanate group average number of 6.1, and an HDI monomer mass concentration of 0.2% by mass. The above physical properties are also shown in Table 3.

Production Example 2-4

Production of P2-4

The inside of a four-necked flask equipped with a stirrer, a thermometer, a reflux condenser, a nitrogen blowing pipe and a dropping funnel was made into a nitrogen atmosphere, and 100 parts of HDI and 17.0 parts of polycaprolactone triol having a number-average molecular weight of 850 were charged thereto. Next, the temperature inside the reactor was kept at 130° C. for 1 hour while stirring to carry out a urethanization reaction. Next, 0.037 parts of a solution prepared by diluting an allophanate reaction catalyst of 2-ethylhexanoate zirconium with 2-ethyl-1-hexanol to 20% by mass was added to carry out an allophanatization reaction. Then, phosphoric acid was added at the time when the refractive index of the reaction solution increased to 0.0052 to stop the reaction. Then, the temperature inside the reactor was kept at 130° C. for 1 hour. Then, the reaction solution was cooled and filtered, and then the unreacted HDI was removed using a thin film evaporator to obtain a polyisocyanate P2-4. The obtained P2-4 had an NCO content of 13.2% by mass, a viscosity at 25° C. of 8,010 mPa·s, a number-average molecular weight of 1,970, an isocyanate group average number of 6.2, and an HDI monomer mass concentration of 0.2% by mass. The above physical properties are also shown in Table 3.

Production Example 2-5

Production of P2-5

The inside of a four-necked flask equipped with a stirrer, a thermometer, a reflux condenser, a nitrogen blowing pipe and a dropping funnel was made into a nitrogen atmosphere, and 100 parts of HDI and 15.5 parts of polycaprolactone diol having a number-average molecular weight of 500 were charged thereto. Next, the temperature inside the reactor was kept at 130° C. for 1 hour while stirring to carry out a urethanization reaction. Next, 0.037 parts of a solution prepared by diluting an allophanate reaction catalyst of 2-ethylhexanoate zirconium with 2-ethyl-1-hexanol to 20% by mass was added to carry out an allophanatization reaction. Then, phosphoric acid was added at the time when the refractive index of the reaction solution increased to 0.0052 to stop the reaction. Then, the temperature inside the reactor was kept at 130° C. for 1 hour. Then, the reaction solution was cooled and filtered, and then the unreacted HDI was removed using a thin film evaporator to obtain a polyisocyanate P2-5. The obtained P2-5 had an NCO content of 14.0% by mass, a viscosity at 25° C. of 4,870 mPa·s, a number-average molecular weight of 1,260, an isocyanate group average number of 4.2, and an HDI monomer mass concentration of 0.2% by mass. The above physical properties are also shown in Table 3.

Production Example 2-6

Production of P2-6

The inside of a four-necked flask equipped with a stirrer, a thermometer, a reflux condenser, a nitrogen blowing pipe and a dropping funnel was made into a nitrogen atmosphere, and 100 parts of HDI was charged thereto. Next, the temperature inside the reactor was kept at 60° C. while stirring. Next, 0.15 parts of a solution prepared by diluting an isocyanuration reaction catalyst of tetrabutylammonium acetate with 2-ethyl-1-hexanol to 10% by mass was added to carry out an isocyanuration reaction. Then, phosphoric acid was added at the time when the NCO content of the reaction solution reached 43.8% by mass to stop the reaction. Then, the temperature inside the reactor was kept at 90° C. for 1 hour. Then, the reaction solution was cooled and filtered, and then the unreacted HDI was removed using a thin film evaporator to obtain a polyisocyanate P2-6. The obtained P2-6 had an NCO content of 23.1% by mass, a viscosity at 25° C. of 1,350 mPa·s, a number-average molecular weight of 590, an isocyanate group average number of 3.2, and an HDI monomer mass concentration of 0.1% by mass. The above physical properties are also shown in Table 3.

TABLE 3

| Polyisocyanate | Production Example 2-1 P2-1 | Production Example 2-2 P2-2 | Production Example 2-3 P2-3 | Production Example 2-4 P2-4 | Production Example 2-5 P2-5 | Production Example 2-6 P2-6 |
| --- | --- | --- | --- | --- | --- | --- |
| (Physical Property 1) NCO Content [% by mass] | 18.2 | 19.1 | 17.7 | 13.2 | 14.0 | 23.1 |
| (Physical Property 2) Viscosity [mPa · s/25° C.] | 21,310 | 13,760 | 9,250 | 8,010 | 4,870 | 1,350 |
| (Physical Property 3) Number-average Molecular Weight | 1,240 | 1,040 | 1,450 | 1,970 | 1,260 | 590 |
| (Physical Property 4) Average Number of Isocyanate Groups | 5.4 | 4.7 | 6.1 | 6.2 | 4.2 | 3.2 |
| (Physical Property 5) Diisocyanate Monomer Mass Concentration [% by mass] | 0.1 | 0.1 | 0.2 | 0.2 | 0.2 | 0.1 |

Example 2-1

1. Preparation of polyisocyanate component B'-1

The inside of a four-necked flask equipped with a stirrer, thermometer, reflux condenser, and nitrogen blow-in tube was made into a nitrogen atmosphere, 88 parts of the polyisocyanate P2-1 was charged thereto and stirred until it became uniform to obtain a polyisocyanate component B'-1. The physical properties of the obtained polyisocyanate component are B'-1 shown in Table 4.

2. Production of polyaspartic coating composition 1

"Desmophen 1420" (aspartic acid ester compound, trade name, manufactured by Covestro, amine value: 201 mg KOH/resin (g)) and "Desmophen 1520" (aspartic acid ester compound, trade name, manufactured by Covestro, amine value: 191 mg KOH/resin (g)) were pre-blended at a mass ratio of 1/1. The blended aspartic acid ester compounds and a polyisocyanate component B'-1 were then blended so that NCO/NH=1.1, and then adjusted with n-butyl acetate so that the solid content of the coating composition=80% by mass to obtain the polyaspartic coating composition 1. The obtained polyaspartic coating composition 1 was used to prepare a coating film and the evaluations 1 to 3 were performed. The results are shown in Table 4.

Examples 2-2 to 2-10, Comparative Examples 2-1 to 2-4

1. Preparation of polyisocyanate components B'-2 to B'-10 and B'-11 to B'-14

Polyisocyanate components B'-2 to B'-10 and B'-11 to B'-14 were obtained in the same manner as in "1." of Example 2-1 except that the compositions were as shown in Tables 2 and 3. The physical properties of the obtained polyisocyanate components B'-2 to B'-10 and B'-11 to B'-14 are shown in Tables 4 and 5.

2. Production of polyaspartic coating compositions 2 to 10 and 11 to 14

Subsequently, polyaspartic coating compositions 2 to 10 and 11 to 14 were obtained in the same manner as in "2." of Example 2-1 except that the compositions were as shown in Tables 2 and 3. The obtained polyaspartic coating compositions 2 to 10 and 11 to 14 were used to prepare coating films, and the evaluations 1 to 3 were performed. The results are shown in Tables 4 and 5.

TABLE 4

| | | Example 2-1 | Example 2-2 | Example 2-3 | Example 2-4 | Example 2-5 | Example 2-6 | Example 2-7 | Example 2-8 | Example 2-9 | Example 2-10 |
|---|---|---|---|---|---|---|---|---|---|---|---|
| (A) Aspartic Acid ester Compound | Desmophen NH1420 [mass by part] | 50 | 50 | 50 | 50 | 50 | 50 | 50 | 50 | 50 | 50 |
| | Desmophen NH1520 [mass by part] | 50 | 50 | 50 | 50 | 50 | 50 | 50 | 50 | 50 | 50 |
| (B') Polyisocyanate Component | P2-1 [mass by part] | 88 | 63 | 39 | — | — | — | — | — | — | — |
| | P2-2 [mass by part] | — | — | — | 84 | 30 | — | — | — | — | — |
| | P2-3 [mass by part] | — | — | — | — | — | 91 | 15 | — | — | — |
| | P2-4 [mass by part] | — | — | — | — | — | — | — | 122 | 24 | — |
| | P2-5 [mass by part] | — | — | — | — | — | — | — | — | — | 116 |
| | P2-6 [mass by part] | — | 21 | 39 | — | 45 | — | 58 | — | 56 | — |
| (Physical Property 1) NCO Content [% by mass] | | 18.2 | 19.4 | 20.7 | 19.1 | 21.5 | 17.7 | 22.0 | 13.2 | 20.1 | 14.0 |
| (Physical Property 2) Viscosity [mPa · s/25° C.] | | 21,310 | 10,580 | 5,260 | 13,760 | 3,460 | 9,250 | 2,020 | 8,010 | 2,270 | 4,870 |
| (Physical Property 3) Number-average Molecular Weight | | 1,240 | 1,050 | 870 | 1,040 | 750 | 1,450 | 720 | 1,970 | 850 | 1,260 |
| (Physical Property 4) Average Number of Isocyanate Groups | | 5.4 | 4.9 | 4.3 | 4.7 | 3.8 | 6.1 | 3.8 | 6.2 | 4.1 | 4.2 |
| (Physical Property 5) Diisocyanate Monomer Mass Concentration [% by mass] | | 0.1 | 0.1 | 0.1 | 0.1 | 0.1 | 0.2 | 0.1 | 0.2 | 0.1 | 0.2 |
| Compounding Ratio | Molar Ratio of NCO/NH | 1.1 | 1.1 | 1.1 | 1.1 | 1.1 | 1.1 | 1.1 | 1.1 | 1.1 | 1.1 |
| Solvent | n-Butyl Acetate [mass by part] | 47 | 46 | 45 | 46 | 44 | 48 | 43 | 56 | 45 | 54 |
| (Evaluation 4) Curability | | ◎ | ◎ | ○ | ◎ | ○ | ◎ | ○ | ◎ | ○ | ○ |
| (Evaluation 5) Chemical Resistance | | ○ | ○ | ○ | ○ | ○ | ○ | ○ | ○ | ○ | ○ |
| (Evaluation 3) Weather Resistance | | ○ | ○ | ○ | ○ | Δ | ○ | Δ | ○ | ○ | ○ |

TABLE 5

| | | Comp. Ex. 2-1 | Comp. Ex. 2-2 | Comp. Ex. 2-3 | Comp. Ex. 2-4 |
|---|---|---|---|---|---|
| (A) Aspartic Acid ester Compound | Desmophen NH1420 [mass by part] | 50 | 50 | 50 | 50 |
| | Desmophen NH1520 [mass by part] | 50 | 50 | 50 | 50 |
| (B') Polyisocyanate Component | P2-1 [mass by part] | — | — | — | — |
| | P2-2 [mass by part] | 18 | — | — | — |
| | P2-3 [mass by part] | — | 7 | — | — |
| | P2-4 [mass by part] | — | — | — | — |
| | P2-5 [mass by part] | — | — | 24 | — |
| | P2-6 [mass by part] | 55 | 65 | 56 | 70 |
| (Physical Property 1) NCO Content [% by mass] | | 22.1 | 22.6 | 20.4 | 23.1 |
| (Physical Property 2) Viscosity [mPa · s/25° C.] | | 2,450 | 1,670 | 1,960 | 1,350 |
| (Physical Property 3) Number-average Molecular Weight | | 650 | 630 | 710 | 590 |
| (Physical Property 4) Average Number of Isocyanate Groups | | 3.4 | 3.4 | 3.4 | 3.2 |
| (Physical Property 5) Diisocyanate Monomer Mass Concentration [% by mass] | | 0.1 | 0.1 | 0.1 | 0.1 |
| Compounding Ratio | Molar Ratio of NCO/NH | 1.1 | 1.1 | 1.1 | 1.1 |
| Solvent | n-Butyl Acetate [mass by part] | 43 | 43 | 45 | 42 |
| (Evaluation 4) Curability | | Δ | Δ | Δ | X |
| (Evaluation 5) Chemical Resistance | | Δ | Δ | Δ | X |
| (Evaluation 3) Weather Resistance | | X | X | X | X |

As shown in Table 4, the coating films using the polyaspartic coating compositions of Examples 2-1 to 2-10 containing (A) an aspartic acid ester and (B) a polyisocyanate component and having an average number of isocyanate groups of 3.8 to 6.2 had excellent curability and chemical resistance.

In addition, the coating films using the polyaspartic coating compositions of Examples 2-1, 2-2, 2-4, 2-6 and 2-8 having an average number of isocyanate groups of 4.7 or more had particularly excellent curability.

Moreover, the coating films using the polyaspartic coating compositions of Examples 2-1 to 2-4, 2-6, and 2-8 to 2-10 having an average number of isocyanate groups of 4.1 or more had particularly excellent weather resistance.

On the other hand, as shown in Table 5, the coating films using the polyaspartic coating compositions of Comparative Examples 1 to 4 containing (A) an aspartic acid ester compound and (B) a polyisocyanate component and having an average number of isocyanate groups of 3.2 to 3.4 had inferior curability, chemical resistance and weather resistance.

In addition, the coating film using the polyaspartic coating composition of Comparative Example 4 having an average number of isocyanate groups of 3.2 had particularly inferior curability, chemical resistance and weather resistance.

From the above, it was confirmed that a coating film having excellent curability, weather resistance and chemical resistance can be obtained by using the polyaspartic coating composition of the present embodiment.

INDUSTRIAL APPLICABILITY

The polyaspartic coating composition of the present invention can be suitably used as a primer or an intermediate or upper coating material for metals such as steel plates or surface-treated steel plates, plastics, ceramics such as inorganic materials, glass and concrete by roll coating, curtain flow coating, spray coating, electrostatic coating, bell coating, immersion, roller coating, brush coating or the like. The polyaspartic coating composition of the present invention can be suitably used to impart aesthetics, weather resistance, acid resistance, rust resistance, chipping resistance, adhesion and the like. In addition, the polyaspartic coating composition of the present invention is also useful as an adhesive, a pressure-sensitive adhesive, an elastomer, a foam, a surface treatment agent and the like.

The invention claimed is:

1. A method for preventing corrosion of a structure, comprising:
    coating the structure with a polyaspartic coating composition, comprising:
    (A) an aspartic acid ester compound represented by the following formula (I)

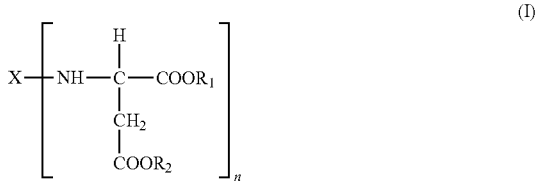

(I)

wherein X is an n-valent organic group obtained by removing a primary amino group of an n-valent polyamine, and $R_1$ and $R_2$ are the same or different organic groups which are inert to the isocyanate group under a reaction condition, and n is an integer of 2 or more, and
    (B) a polyisocyanate component obtained by reacting one or two or more diisocyanate monomers selected from the group consisting of an aliphatic and alicyclic diisocyanate with a polycaprolactone polyol having a number-average molecular weight of 500 to 1,500,
wherein
    a ratio of the polycaprolactone polyol to a total amount of the polyol is 20% by mass or more,
    the polyisocyanate component contains 10.0% by mass or less of an isocyanurate trimer with respect to a total amount of the polyisocyanate component,
    the structure is a bridge, a highway, a power transmission tower, or a wind power generation blade, and
    the polyol further contains a polyoxyalkylene polyol.

2. The method according to claim 1, wherein a ratio of the polyoxyalkylene polyol to a total amount of the polyoxyalkylene polyol and the polycaprolactone polyol is 80% by mass or less.

3. The method according to claim 1, wherein an equivalent ratio between the amino group of (A) the aspartic acid ester compound and the isocyanate group of (B) the polyisocyanate component is amino group:isocyanate group=10:1 to 1:10.

4. A method for preventing corrosion of a structure, comprising:
    coating the structure with a polyaspartic coating composition, comprising:
    (A) an aspartic acid ester compound represented by the following general formula

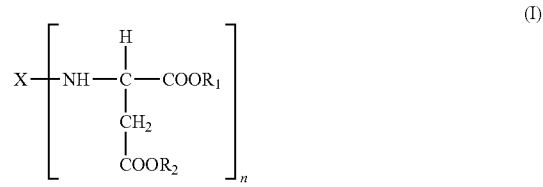

(I)

wherein X is an n-valent organic group obtained by removing a primary amino group of an n-valent polyamine, and $R_1$ and $R_2$ are the same or different organic groups which are inert to the isocyanate group under a reaction condition, and n is an integer of 2 or more, and
    (B') a polyisocyanate component obtained by reacting one or two or more diisocyanate monomers selected from the group consisting of an aliphatic diisocyanate and an alicyclic diisocyanate,
wherein
    an average number of isocyanate groups in the polyisocyanate component is 3.5 to 10,
    a number-average molecular weight of the polyisocyanate component is 870 to 2,000, and
    the structure is a bridge, a highway, a power transmission tower, or a wind power generation blade.

5. The method according to claim 4, wherein an equivalent ratio between the amino group of (A) the aspartic acid ester compound and the isocyanate group of (B') the polyisocyanate component is amino group:isocyanate group=10:1 to 1:10.

6. The method according to claim 1, wherein the diisocyanate monomer contains a hexamethylene diisocyanate.

7. Use of a polyaspartic coating composition for heavy-duty anticorrosion coating of bridges, highways, power transmission towers, or wind power generation blades, wherein
the polyaspartic coating composition comprises:
(A) an aspartic acid ester compound represented by the following formula (I)

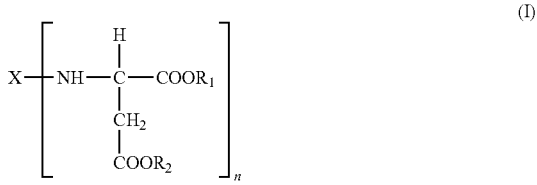

X is an n-valent organic group obtained by removing a primary amino group of an n-valent polyamine, and $R_1$ and $R_2$ are the same or different organic groups which are inert to the isocyanate group under a reaction condition, and n is an integer of 2 or more, and
(B) a polyisocyanate component obtained by reacting one or two or more diisocyanate monomers selected from the group consisting of an aliphatic and alicyclic diisocyanate with a polycaprolactone polyol having a number-average molecular weight of 500 to 1,500,
wherein
a ratio of the polycaprolactone polyol to a total amount of the polyol is 20% by mass or more, and
the polyisocyanate component contains 2.7% by mass or more and 10.0% by mass or less of an isocyanurate trimer with respect to a total amount of the polyisocyanate component.

8. The method according to claim 4, wherein the diisocyanate monomer contains a hexamethylene diisocyanate.

9. A method for preventing corrosion of a structure, comprising:
coating the structure with a polyaspartic coating composition comprising:
(A) an aspartic acid ester compound represented by the following formula (I)

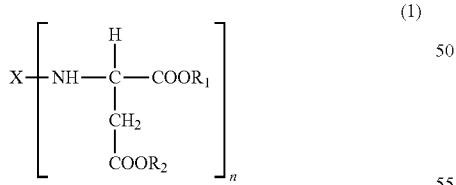

X is an n-valent organic group obtained by removing a primary amino group of an n-valent polyamine, and $R_1$ and $R_2$ are the same or different organic groups which are inert to the isocyanate group under a reaction condition, and n is an integer of 2 or more, and
(B) a polyisocyanate component obtained by reacting one or two or more diisocyanate monomers selected from the group consisting of an aliphatic and alicyclic diisocyanate with a polycaprolactone polyol having a number-average molecular weight of 500 to 1,500,
wherein
a ratio of the polycaprolactone polyol to a total amount of the polyol is 20% by mass or more,
the polyisocyanate component contains 10.0% by mass or less of an isocyanurate trimer with respect to a total amount of the polyisocyanate component, and
the polyol further contains a polyoxyalkylene polyol.

10. The method according to claim 9, wherein a ratio of the polyoxyalkylene polyol to a total amount of the polyoxyalkylene polyol and the polycaprolactone polyol is 80% by mass or less.

11. The method according to claim 9, wherein an equivalent ratio between the amino group of (A) the aspartic acid ester compound and the isocyanate group of (B) the polyisocyanate component is amino group:isocyanate group=10:1 to 1:10.

12. The method according to claim 9, wherein the diisocyanate monomer contains a hexamethylene diisocyanate.

13. The method for preventing corrosion of a structure according to claim 1, wherein a number-average molecular weight of the polyisocyanate component is 1,350 to 2,000.

14. The method for preventing corrosion of a structure according to claim 7, wherein a number-average molecular weight of the polyisocyanate component is 1,350 to 2,000.

15. The method for preventing corrosion of a structure according to claim 9, wherein a number-average molecular weight of the polyisocyanate component is 1,350 to 2,000.

16. A method for preventing corrosion of a structure, comprising:
coating the structure with a polyaspartic coating composition, comprising:
(A) an aspartic acid ester compound represented by the following formula (I)

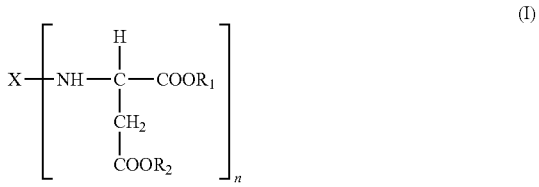

wherein X is an n-valent organic group obtained by removing a primary amino group of an n-valent polyamine, and $R_1$ and $R_2$ are the same or different organic groups which are inert to the isocyanate group under a reaction condition, and n is an integer of 2 or more, and
(B) a polyisocyanate component obtained by reacting one or two or more diisocyanate monomers selected from the group consisting of an aliphatic and alicyclic diisocyanate with a polycaprolactone polyol having a number-average molecular weight of 500 to 1,500,
wherein
a ratio of the polycaprolactone polyol to a total amount of the polyol is 20% by mass or more,
the structure is a bridge, a highway, a power transmission tower, or a wind power generation blade, and
the polyisocyanate component contains 2.7% by mass or more and 10.0% by mass or less of an isocyanurate trimer with respect to a total amount of the polyisocyanate component.

17. The method for preventing corrosion of a structure according to claim 9, wherein the polyisocyanate component contains 2.7% by mass or more and 10.0% by mass or less of an isocyanurate trimer with respect to a total amount of the polyisocyanate component.

\* \* \* \* \*